(12) United States Patent
Brennan

(10) Patent No.: US 11,389,820 B2
(45) Date of Patent: Jul. 19, 2022

(54) METHOD OF DESIGNING AND MANUFACTURING A DISTRIBUTOR BAR FOR APPLYING A VISCOUS FOAMABLE LIQUID MIXTURE ONTO A LAMINATOR

(71) Applicant: Huntsman International LLC, The Woodlands, TX (US)

(72) Inventor: Mark Joseph Brennan, Aarschot (BE)

(73) Assignee: HUNTSMAN INTERNATIONAL LLC, The Woodlands, TX (US)

(*) Notice: Subject to any disclaimer, the term of this patent is extended or adjusted under 35 U.S.C. 154(b) by 73 days.

(21) Appl. No.: 16/403,655

(22) Filed: May 6, 2019

(65) Prior Publication Data

US 2019/0255555 A1    Aug. 22, 2019

Related U.S. Application Data

(62) Division of application No. 15/509,004, filed as application No. PCT/EP2015/069360 on Aug. 24, 2015, now Pat. No. 10,328,450.

(30) Foreign Application Priority Data

Sep. 11, 2014    (EP) .................................. 14184340

(51) Int. Cl.
*B05C 5/02*    (2006.01)
*B05B 1/20*    (2006.01)
(Continued)

(52) U.S. Cl.
CPC ............ *B05C 5/027* (2013.01); *B01F 23/235* (2022.01); *B05B 1/20* (2013.01); *B05C 5/0245* (2013.01);
(Continued)

(58) Field of Classification Search
CPC ... B05C 5/027; B05C 5/0291; B01F 3/04446; B29C 44/468; B05B 1/20
See application file for complete search history.

(56) References Cited

U.S. PATENT DOCUMENTS 3,431,889 A * 3/1969 Fraatz ..................... B05C 5/004
118/315
2014/0342089 A1* 11/2014 Koster .................. B05B 7/0056
427/287
2015/0024138 A1* 1/2015 Figovsky .............. B29C 44/367
427/427.4

FOREIGN PATENT DOCUMENTS

WO    WO-2010035478 A1 *  4/2010    ............. B05C 5/027

OTHER PUBLICATIONS

A B J Kroezen et al., The flow properties of foam, Journal of the Society of Dyers and Colourists 393-400, Published Oct. 1988 (Year: 1988).*

(Continued)

*Primary Examiner* — Moshe Wilensky
*Assistant Examiner* — Kyle A Cook
(74) *Attorney, Agent, or Firm* — Huntsman International LLC; Robert Diaz

(57) ABSTRACT

Method of designing and manufacturing a distributor bar for use in a production line comprising a mixing head for providing a viscous foamable liquid mixture, a laminator with a predefined speed of at least 20 m/min, the distributor bar having a central inlet fluidly connected to a number of outlets via a main channel. The method comprises: choosing (3001) a geometry for the distributor bar and defining a set of geometrical parameters; assigning (3002) values to said parameters; creating (3003) a virtual model; simulating (3005) flow in said model by performing a Computational Fluid Dynamics simulation (CFD), taking into account (3004) a non-Newtonian shear thinning model; e) evaluating (Continued)

the simulated flow; building (2007) a physical distributor bar. A distributor bar, a production line, and a computer program product.

20 Claims, 13 Drawing Sheets

(51) Int. Cl.
*B29C 44/46* (2006.01)
*B29C 64/106* (2017.01)
*B29C 64/124* (2017.01)
*B29C 64/386* (2017.01)
*B01F 23/235* (2022.01)
*B33Y 10/00* (2015.01)
*B33Y 50/02* (2015.01)
*B33Y 80/00* (2015.01)
*B22C 1/22* (2006.01)
*B29C 44/32* (2006.01)
*B29C 44/34* (2006.01)
*B29C 45/00* (2006.01)
*G05B 19/4099* (2006.01)
*B01F 101/00* (2022.01)
*B29K 55/02* (2006.01)
*B29K 75/00* (2006.01)
*B29K 77/00* (2006.01)
*B29L 23/00* (2006.01)

(52) U.S. Cl.
CPC .......... *B05C 5/0291* (2013.01); *B22C 1/2273* (2013.01); *B29C 44/32* (2013.01); *B29C 44/3442* (2013.01); *B29C 44/461* (2013.01); *B29C 44/468* (2013.01); *B29C 45/0001* (2013.01); *B29C 64/106* (2017.08); *B29C 64/124* (2017.08); *B29C 64/386* (2017.08); *B33Y 10/00* (2014.12); *B33Y 50/02* (2014.12); *B33Y 80/00* (2014.12); *G05B 19/4099* (2013.01); *B01F 2101/2204* (2022.01); *B29K 2055/02* (2013.01); *B29K 2075/00* (2013.01); *B29K 2077/00* (2013.01); *B29L 2023/22* (2013.01); *G05B 2219/35134* (2013.01); *G05B 2219/49004* (2013.01); *G05B 2219/49007* (2013.01)

(56) References Cited

OTHER PUBLICATIONS

Markus Stephan et al., CFD Topology Optimization of Automotive Components, 4th European Automotive Simulation Conference (Year: 2009).*
Pipe Bending and Tube Bending, Jorgenson Metal Rolling & Forming Inc., Screen shot taken on Sep. 21, 2011 (Year: 2011).*
Kaufui Wong et al., A Review of Additive Manufacturing, International Scholarly Research Notices, vol. 2012, Published Aug. 16, 2012 (Year: 2012).*
Milling, CustomPartNet.com, Screen shot captured on Jul. 15, 2013 (Year: 2013).*

* cited by examiner

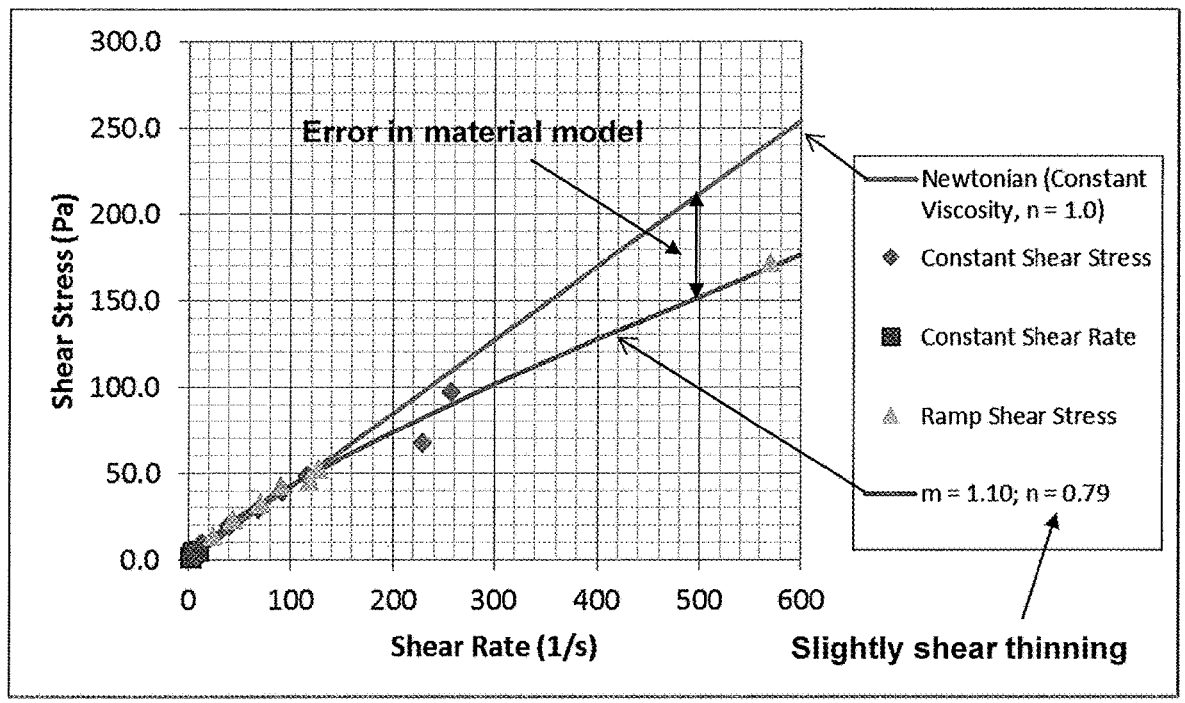

FIG 13

Viscosity models

Ostwald de Waele (Power Law)
$$\mu = m\dot{\gamma}^{n-1}$$

Cross
$$\mu = \frac{\mu_0}{1 + (\lambda\dot{\gamma})^n}$$

Carreau Yasuda
$$\mu = \mu_\infty + \frac{\mu_0 - \mu_\infty}{(1 + (\lambda\dot{\gamma})^a)^{\frac{1-n}{a}}}$$

Herschel Bulkley
$$\mu = \frac{\tau_Y}{\lambda\dot{\gamma}} + m\dot{\gamma}^{n-1}$$

Bingham:
$$\mu = \frac{\tau_Y}{\dot{\gamma}} + K$$

Bird-Carreau:
$$\mu = \mu_\infty + \frac{(\mu_0 - \mu_\infty)}{(1 + (\lambda\dot{\gamma})^2)^{\frac{1-n}{2}}}$$

Casson:
$$\mu = \left(\sqrt{\frac{\tau_Y}{\dot{\gamma}}} + \sqrt{K}\right)^2$$

FIG 14

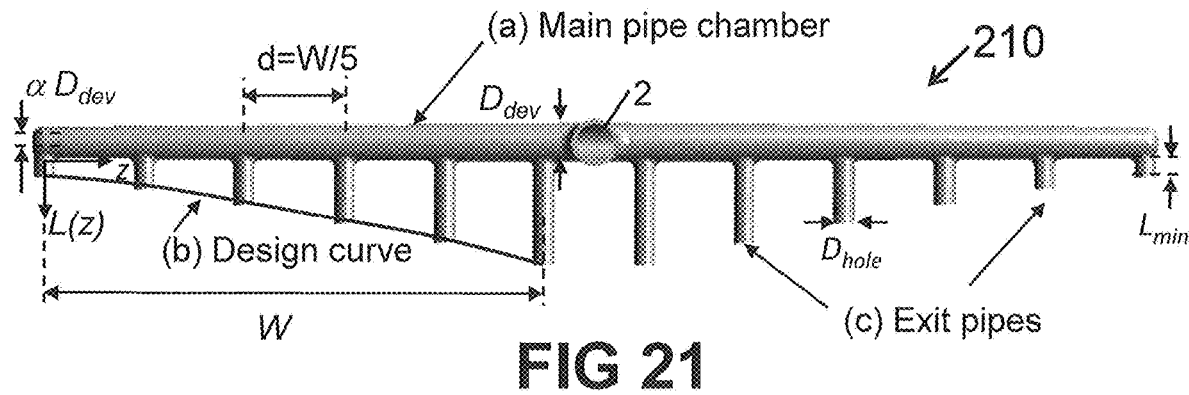
FIG 21
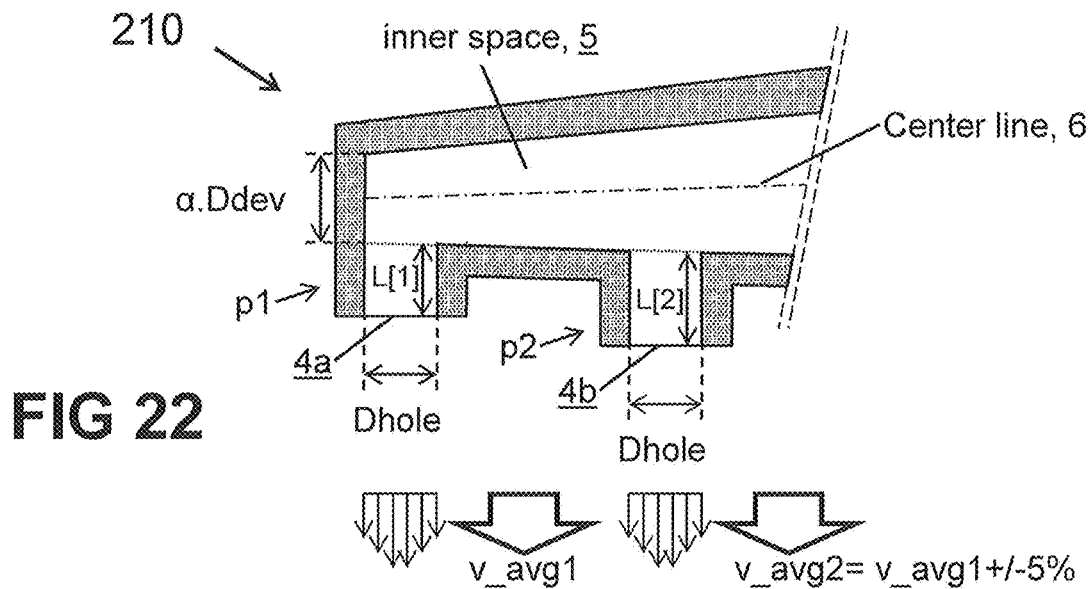
FIG 22
FIG 23
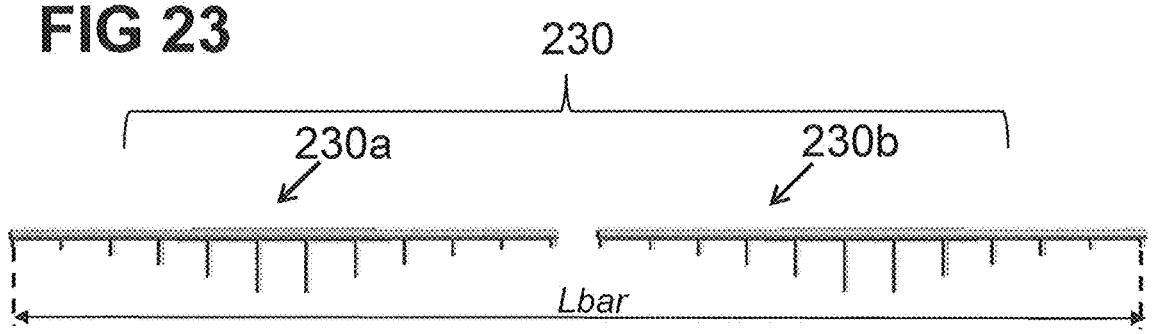

(a) Varying exit hole entrance areas A(z)   300
2
All exit pipes the same distance from the laminator   (b) Exit pipes

METHOD OF DESIGNING AND MANUFACTURING A DISTRIBUTOR BAR FOR APPLYING A VISCOUS FOAMABLE LIQUID MIXTURE ONTO A LAMINATOR

CROSS-REFERENCE TO RELATED APPLICATIONS

This application is a divisional application of U.S. patent application Ser. No. 15/509,004 filed Mar. 6, 2017 which is the National Phase of International Application PCT/EP2015/069360 filed Aug. 24, 2015 which designated the U.S. and which claims priority to European App. Serial No. 14184340.9 filed Sep. 11, 2014. The noted applications are incorporated herein by reference.

FIELD OF THE INVENTION

The present invention relates to devices for applying a foamable reaction mixture onto a layer, such as onto a metal sheet or a laminator for making foam insulation panels. More in particular, the present invention relates to a method of designing and manufacturing a distributor bar for applying a viscous foamable liquid mixture onto such layer, to a distributor bar so designed and manufactured, and to a production line comprising such a distributor bar, and a computer program product for performing at least some steps of said method.

BACKGROUND OF THE INVENTION

Systems for applying a viscous foamable mixture, e.g. a mixture for generating polyurethane (PU) foams or polyisocyanurate (PIR) foams, are widely practiced nowadays. Such systems typically have a first (lower) continuously operating belt system, also referred to herein as "laminator", upon which the viscous foamable mixture is laid down, and a second (upper) continuous belt system for forming so called sandwich panels in between. These panels may e.g. be used for the design of facades on a very wide variety of buildings, alongside sandwich elements for cold-store insulation, etc. The foamable mixture may be a mixture of a polyol and an isocyanate, but it is known in the art that many additives may also be added, such as blowing agents, flame retardants, etc, which are mixed in one or more mixing heads. From the mixing head(s) the viscous fluid mixture is brought to the distributor bar, from which the mixture is distributed over the width of the laminator.

Ideally the viscous fluid mixture is deposited on the laminator in such a way that it creates a uniform mixture layer, but, as is known in the art, designing a distributor bar capable of providing such a uniform mixture layer, is far from trivial. This is especially true for high speed laminators, e.g. having a laminator speed between 20 m/min and 100 m/min, or between 50 m/min and 100 m/min.

WO2009/077490 and US2011/0003082 describe a static distributor bar (see FIG. 1) which allegedly provides a foamed material with less voids and less surface defects as compared to a foamed layer made by using an oscillating rake applicator. Apart from listing very broad parameter ranges, this application gives no guidance about potential problems of laminators, and/or how good laminators are to be designed.

US2010/0080900A1 describes a method for producing composite elements based on foams based on isocyanate. The publication provides some parameters which may be optimized with the intention to keep the velocity of the reaction mixture in the tube or on exiting the holes constant, however, the application does not offer a concrete solution of how exactly that intention can be achieved. Given the large number of variables which need to be defined, the suggested solution is actually a multi-dimensional problem which cannot be easily solved without undue burden.

WO2013/107742 describes another device (replicated herein as FIG. 2) for applying a foaming reaction mixture onto a layer, whereby a central axis of the casting rake (another name for a distributor bar) forms an angle <=80° relative to the axis of movement of the laminator.

US2013/0280538 describes yet another device (replicated herein as FIG. 3) for applying a liquid reaction mixture, whereby the outer openings are directed outwardly under an angle of 1° to 50° with respect to a direction perpendicular to the laminator.

All prior art systems have as a goal to lay down a mixture layer that is as uniform as possible over the entire width of the top layer (e.g. sheet or laminator), but all seem to fail to describe in sufficient detail how this goal is to be achieved. While this goal may be relatively easy to achieve for relatively low laminator speeds (e.g. less than 10 m/min) in combination with a foamable mixture with a relatively low reactivity (e.g. having a cream time higher than 10 s), this goal is not automatically achieved, and actually becomes a real technical challenge at relatively high laminator speeds (e.g. above 20 m/min or above 30 m/min or even higher), or stated differently at a flow rate of the foamable liquid mixture of at least 0.100 L/s per meter length of the distributor bar, especially when viscous foamable mixtures are used with a higher reactivity (which is usually the case for production lines with higher laminator speeds). A distributor bar for such high laminator speeds (or formulated without referring to the line speed: a distributor bar for providing such a high flow rate per unit length) really needs to be specifically designed, or otherwise non-uniformities, e.g. unevenness and/or density gradients and/or knit lines and/or even gaps will occur in the foamed layer.

SUMMARY OF THE INVENTION

It is an object of embodiments of the present invention to provide a good distributor bar, and a method for designing and manufacturing such distributor bar, and a production line comprising such distributor bar, and a computer program product for manufacturing such distributor bar.

More specifically, it is an object of particular embodiments of the present invention to provide a distributor bar having a central inlet and a plurality of outlets, wherein the geometry and dimensions of the distributor bar are specifically adapted such that, in use, the distributor bar is capable of distributing a viscous foamable liquid mixture entering at a predefined flow rate over a predefined length, wherein the ratio of said flow rate and said length is at least $0.100 \times 10^{-3}$ m²/s, resulting in a substantially uniform expanded foam material (e.g. in terms of mechanical strength, density gradients, voids, gaps or knit lines), and a method for designing and manufacturing same, and a computer program product for manufacturing same, or wherein the ratio is at least 0.175 L/s per meter length of the distributor bar (corresponding to e.g. 1 m wide×25 mm thick at 15 m/min, or to e.g. 1 m wide×12.5 mm thick×30 m/min), or wherein the ratio is at least 0.350 L/s per meter length of the distributor bar (corresponding to e.g. 1 m wide×50 mm thick at 15 m/min, or to e.g. 1 m wide×25 mm thick×30 m/min), or wherein the ratio is at least 0.500 L/s per meter length of the distributor bar (corresponding to e.g. 1 m wide×71 mm thick at 15 m/min), or wherein the ratio is at least 0.700 L/s per meter length of the distributor bar (corresponding to e.g. 1 m wide×100 mm thick at 15 m/min), or wherein the ratio is at least 1.000 L/s per meter length of the distributor bar (corresponding to e.g. 1 m wide×143 mm thick at 15 m/min, or e.g. 1 m wide×72 mm thick×30 m/min or e.g. 1 m wide×50 mm thick×43 m/min).

It is also an object of particular embodiments of the present invention to provide a distributor bar suitable for use in a production line, the production line comprising one or more mixing heads providing a polyurethane (PUR) or polyisocyanurate (PIR) mixture at a total flow rate of at least 0.10 L/s, or at least 0.20 L/s, or at least 0.30 L/s, or at least 0.35 L/s, e.g. at least 0.40 L/s, e.g. at least 0.50 L/s, and having a laminator width of at least 1.0 m, e.g. at least 1.2 m and having a laminator speed of at least 15 m/min, e.g. at least 20 m/min, e.g. at least 25 m/min, e.g. at least 30 m/min, e.g. at least 40 m/min, e.g. at least 50 m/min, while providing a substantially uniform expanded foam material.

This objective is accomplished by a method, and a distributor bar, and a production line, and a computer program product according to embodiments of the present invention.

In a first aspect, the present invention provides a method of designing and manufacturing a distributor bar having a central inlet for receiving a predefined viscous foamable liquid mixture at a predefined flow rate, and having a predefined even number of outlets fluidly connected to said inlet via a main channel, the number of outlets being spaced apart equidistantly over a predefined length, wherein the distributor bar has a geometry such that, when a ratio of the predefined flow rate (Qtotal) entering the central inlet and the predefined length is at least $1.00 \times 10^{-4}$ m²/s, the mixture will leave each of the outlets with an average velocity which is constant for each of the outlets within a predefined tolerance margin of at most +/−5%; the method comprising the steps of: a) choosing a geometry for the distributor bar to be manufactured and defining a set of parameters corresponding to a physical shape and dimensions of said distributor bar; b) assigning values to the geometrical parameters; c) creating a virtual model of said geometry having said assigned values; d) simulating a flow of liquid mixture in said virtual model by performing a Computational Fluid Dynamics simulation, taking into account in the simulation a non-Newtonian shear thinning model and predefined shear thinning parameter of said viscous foamable liquid mixture; e) evaluating whether the simulated flow satisfies a predefined criterium, and if an outcome of said evaluation is negative, repeating steps b) to e); and if an outcome of said evaluation is positive, either repeating steps b) to e) or going to step f); f) building a physical distributor bar having a geometry that satisfied the predefined criterium.

It is a major advantage of embodiments of methods according to the present invention in that it allows to design and produce distributor bars for depositing a viscous foamable liquid mixture such as e.g. a polyurethane mixture, which appear to be non-Newtonian shear-thinning mixtures, on laminators having a line speed higher than 15 m/min, e.g. higher than 20 m/min, or higher than 30 m/min, or higher than 40 m/min, or higher than 50 m/min, while still guaranteeing that, in operation, the viscous foamable liquid layer deposited by said distributor bar on said laminator will merge to a uniform liquid layer (without gaps in between), and that the expanded foam will be a uniform foam layer (without knit lines).

It is an advantage of embodiments of the present invention that the simulation takes into account the shear-thinning characteristic of the foamable fluid in question, and that these simulations correspond very well with reality. As far as is known to the inventors, the shear-thinning effect was not taken into account so far in the design of distributor bars, probably because everyone believed and took for granted that the liquid mixture, in particular polyurethane (PUR), coming from the mixing head behaves as a Newtonian viscous liquid, at least initially, while travelling through the distributor bar. However, this turned out to be wrong, and without taking this behavior into account, experiments with prototypes did not correspond well with the simulations, hence it was impossible to use simulations for designing distributor bars, especially when it becomes difficult or more critical, which is the case for higher laminator speeds (e.g. above 20 m/min or above 30 m/min), especially when also more reactive mixtures are used.

It is an advantage that the simulated behavior of the virtual distributor bar corresponds very well with the actual behavior of such a physical distributor bar, provided a non-Newtonian shear-thinning model is taken into account.

It is an advantage of having a means of simulating that corresponds very well with reality, in that it allows to simulate designs before actually building them. In this way time and money can be saved.

The invention is especially suitable for distributing polyurethane or polyisocyanurate liquid mixtures, optionally with added air, but also works for other viscous foamable liquid mixtures.

It is a major advantage of using the simulation as part of the design and manufacturing, because it seems impossible to find a satisfactory solution without using such a simulation. The steps of choosing a geometry, choosing an analytical expression, using a non-Newtonian-shear-thinning model with particular parameters, etc. all contribute to the method because they determine the final shape and dimensions of the physical distributor bar, and hence its behavior when in use.

In an embodiment, the non-Newtonian shear thinning model is selected from the group consisting of the following models: Ostwald de Waele, Cross, Carreau Yasuda, Herschel Bulkley, Bingham, Bird-Carreau and Casson.

In an embodiment, step a) comprises: choosing a geometry such as curvature and cross sectional area for the main channel, and defining a first set of parameters representative for a physical shape and physical dimensions of the main channel; choosing a geometry for the plurality of outlets, and defining a second set of parameters representative for a physical shape and physical dimensions of the plurality of outlets.

In an embodiment, the method further comprises a step of choosing a parameterized analytical function with only two parameters for determining said number of second set of parameters; and step b) comprises assigning values to said parameters, and calculating geometrical parameters for each of the number of outlets using said analytical function.

It is a major advantage of using an analytical expression with two or only two parameters k, a in that it allows the multi-dimensional problem to be reduced to a two-dimensional problem. This contributes enormously to the performance (or convergence speed) of the method in that it reduces the time required to find a solution dramatically by reducing the multi-dimensional problem (for example at least a 12-dimensional or 16-dimensional or 24-dimensional problem (depending on the number of outlets) to a two-dimensional problem. Hence, by using this "transformation" to only two parameters, the required computation time is drastically reduced.

In an embodiment, said parameterized analytical function in only two variables can be expressed by or is equivalent to the function: $L(z)=B+k\cdot(z/W)^a$, or can be expressed by or is equivalent to the function: $A(z)=B+k\cdot(z/W)^a$, where B and W are constants, z is a distance in the length direction of the distribution bar, L is a length of an outlet, A is a cross sectional area of an outlet, and 'k' and 'a' are parameters.

It was found that the first expression is very suitable for embodiments (as shown in FIG. 21 and FIG. 27 and FIG. 28) where the inner diameter of the outlets is constant, and only the length of the outlets is to be varied.

It was found that the second expression is very suitable for embodiments (as shown in FIG. 29) where the length of pipes is constant and the exit opening is constant, but the outlet pipes are conical.

It is noted however that other mathematical representations or formulas giving the same results, may also be used, such as for example: $L(z)=B+k\cdot(1-z/W)^a$ and $A(z)=B+k\cdot(1\cdot z/W)^a$.

The parameter 'a' used as an exponent is related to the shear-thinning viscosity of the viscous foamable fluid mixture. If the so called "power law" is used to represent the non-Newtonian shear-thinning viscosity behavior, with 'n' being the exponent of the power law function, then the optimal value of 'a' is close to the value n+1.

In an embodiment, step e) is repeated for a predefined number of combinations of said two parameters.

The parameters 'k' and 'a' may e.g. be varied around a pair of initial values within a margin of about +/−15%, in order to find an "optimum" solution, but that is not absolutely required, and larger variations, or smaller variations, or no variation at all, may also be used.

If both parameters are varied within a range of e.g. +/−15% in steps of for example 5%, only 7×7=48 simulations need to be done as compared to 12 to the power 7 simulations if the length of each exit pipe would be varied within a range of +/−15% around a starting value is steps of 5%. It is immediately clear that the latter is not feasible. Varying the parameters as indicated allows to select the "best result" from a limited number of simulations.

In an embodiment, step e) comprises calculating an average exit velocity for each outlet, and calculating a variation of these average exit velocities; and the predefined criterium is that the calculated variation of average exit velocities lies within a tolerance margin of at most +/−5%.

The reason why "average exit velocity" is used instead of "exit velocity" is because the velocity is not constant of the outlet opening, but actually has a velocity profile over the exit opening.

In an embodiment, the predefined criterium further comprises checking whether each of the average exit velocities lies in the range of 2.5 to 3.5 m/s.

It is an advantage of choosing the exit velocities in the range of 2.5 to 3.5 m/s because for values of at least 2.5 m/s the risk of fouling is reduced, and for values lower than 3.5 m/s the risk of splashing and inclusion of air bubbles is reduced.

In an embodiment, the tolerance margin is at most +/−4%, or at most +/−3%, or at most +/−2%.

If no solution can be found within the specified tolerance margin, then the tolerance margin may be increased. Simulations have shown that +/−3% is achievable for the examples described herein.

In an embodiment, the viscous foamable liquid mixture comprises raw materials for forming polyurethane (PUR) or polyisocyanurate (PIR).

In particular embodiments, the viscous foamable liquid mixture comprises at least Methylene diphenyl diisocyanate (MDI) and Polyol.

The present invention is particularly suitable for designing and manufacturing a distributor bar for distributing raw materials for forming PUR or PIR at relatively high flow rate (corresponding to a relatively high speed of a laminator bar, e.g. at least 15 m/min, or at least 20 m/min, or even more, up to about 100 m/min. Mixtures for forming polyurethane (PUR) or polyisocyanurate (PIR) are well known in the art, and may comprise for example Methylene diphenyl diisocyanate (MDI) and Polyol and water (optional)+Physical Blowing Agent (or mixtures of)+one or more Catalysts. The raw materials for forming PIR are similar to those for polyurethane (PUR) except that the proportion of methylene diphenyl diisocyanate (MDI) is higher (typically >1.5) and a polyester-derived polyol is used in the reaction instead of a polyether polyol. Catalysts and additives used in PIR formulations also differ from those used in PUR.

In an embodiment, the viscous foamable liquid mixture comprises raw materials for forming polyurethane (PUR) or polyisocyanurate (PIR), and the non-Newtonian shear thinning model is represented by the formula: $\mu=m\dot{\gamma}^{n-1}$, with 'm' being a value in the range of 0.80 to 1.40 and 'n' being a value in the range of 0.50 to 0.90.

The given formula is generally known as the "Ostwald de Waele model", or as the "Power law model". The value of 'm' and 'n' can be determined by viscosity measurement of the viscous foamable liquid mixture, and the value of 'n' is typically a value in the range of 0.69 to 0.89, e.g. in the range of 0.74 to 0.84, for example about 0.79. The value of 'm' is typically a value in the range of 0.80 to 1.40, e.g. in the range of 0.90 to 1.30, e.g. in the range of 1.00 to 1.20, e.g. about 1.10.

In an embodiment, the viscous foamable liquid mixture comprises raw materials for forming polyurethane (PUR) or polyisocyanurate (PIR), and added air, and wherein the non-Newtonian shear thinning model is represented by the formula: $\mu=m\dot{\gamma}^{n-1}$, with $m=m_0/(1-1.16\cdot\phi^{0.424})$, and $n=n_0-0.59\phi$, '$m_0$' being a value in the range of 0.80 to 1.40 and '$n_0$' being a value in the range of 0.50 to 0.90, and $\phi$ being the volume fraction of air added.

The present invention is also particularly suitable for designing and manufacturing a distributor bar for distributing PUR mixed with an amount of added air, or PIR mixed with an amount of added air, which may be added to the mixture to aid nucleation of the foam when it is on the laminator.

In an embodiment, step b) comprises assigning such values that an estimate of an average residence time (tdev) of the viscous foamable fluid mixture in the main channel is less than 150 ms, and step e) further comprises calculating an average residence time (tdev) of the viscous foamable fluid mixture in the main channel and verifying whether the calculated average residence time (tdev) is less than 150 ms.

It is an advantage of choosing a residence time less than 150 ms, or less than 80 ms for higher flow rate (corresponding to higher laminator speeds), because in the latter case typically also the viscous foamable mixture is more reactive. By reducing the average residence time, the risk of fouling is reduced.

In an embodiment, step a) comprises choosing a geometry for the main channel as being tubular and tapering towards the outer ends.

It is an advantage of embodiments of the present invention that the main chamber is tapered, because it reduces the average residence time of the mixture inside the distributor bar and thus also the risk of fouling.

In an embodiment, step a) comprises: choosing a main channel having a cross sectional shape selected from the group consisting of: circular, elliptical, triangular, triangular with rounded edges, square, square with rounded edges, rectangular, rectangular with rounded edges, pentagonal, pentagonal with rounded edges, hexagonal, hexagonal with rounded edges, octagonal, octagonal with rounded edges, polygonal, polygonal with rounded edges, and wherein the cross sectional area of the main channel varies continuously with distance from the center.

It is an advantage of using a continuous (in contrast to stepwise) decreasing cross section of the main channel, and to use a channel with rounded edges (in contrast to shaft edges) because such a channel has a reduced risk of fouling.

In an embodiment, step a) comprises: choosing an main channel having a circular cross section with a first inner diameter in the middle of the distributor bar, and a second inner diameter at its outer ends, and wherein the diameter decreases in a continuous manner between the center and the outer ends, and wherein the ratio of the second diameter and the first diameter is a value in the range of 50% to 95%.

The diameter of the main chamber of the distributor bar may e.g. decrease linearly from the center towards the outer ends of the distributor bar. Alternatively, the square of the diameter may decreases linearly from the center towards the outer ends. The ratio-value is preferably a value in the range from 0.60 to 0.90, more preferably a value in the range of 0.75 to 0.80.

In an embodiment, the geometry of the main channel is chosen to have a straight center line; and the geometry of the outlets is chosen to be cylindrical pipes with a constant inner diameter, the pipes having a variable length.

In particular embodiments, the variable lengths L[i] are calculated using said parameterized analytical function in only two variables.

In an embodiment, the geometry of the main channel is chosen to have a curved center line; and the geometry of the outlets is chosen to be cylindrical pipes with a constant inner diameter, the exit openings of each of the pipes being located in a single plane.

In particular embodiments, said curvature is calculated using said parameterized analytical function in only two variables.

It is a further advantage of this embodiment that the distance between the laminator and the lower end of the pipes is the same for all the pipes, in that the speed at which the viscous mixture arrives on the laminator is also constant. This may improve the uniformity of the layer even more.

In an embodiment, the geometry of the main channel is chosen to have a straight center line; and the geometry of the outlets is chosen to be exit slots having a constant cross section over their length, the cross section being rectangular or rectangular with rounded edges, and having a variable length.

In particular embodiments, the variable lengths L[i] are calculated using said parameterized analytical function in only two variables.

In an embodiment, the geometry of the main channel is chosen to have a straight center line; and the geometry of the outlets is chosen to be funnels with a same exit opening, the funnels having different cross-sectional areas at their interface with the main channel.

In particular embodiments, the variable cross sectional areas A[i] are calculated using said parameterized analytical function in only two variables.

In an embodiment, the building of step f) comprises injection moulding using materials such as polyamide 6 (PA6) or acrylonitrile butadiene styrene (ABS).

This manufacturing technique requires moulds to be made, which is relatively time-consuming (typically several weeks) and is quite expensive, thus the so called "fixed cost" is relatively high, but the so called "variable cost" of the distributor bars thus made is relatively low.

In an embodiment, the building of step f) comprises stereolithography additive manufacturing using materials such as Tusk XC2700.

In an embodiment, the building of step f) comprises Fused deposition modeling additive manufacturing using materials such as acrylonitrile butadiene styrene (ABS).

This manufacturing technique is also known as "3D Printing". It is especially suited for fast prototyping.

In an embodiment, the building of step f) comprises Computer numerical control (CNC) milling using metal material or metal alloys.

This manufacturing technique is also especially suited for fast prototyping, especially if the distributor bar is to be made of metal or metal alloys.

In an embodiment, the material is selected from the group consisting of: aluminum, steel, aluminum alloys, steel alloys, stainless-steel.

In a second aspect, the present invention provides a method of designing and manufacturing a distributor bar for use in a production line for producing a substantially homogenous foamed material, the production line having one or more mixing heads adapted for providing a non-Newtonian shear-thinning viscous foamable liquid mixture at a predefined flow rate, and a laminator having a predefined width and adapted for running at a line speed of at least 15 m/min, wherein a ratio of the predefined flow rate and the predefined laminator width is at least $1.00 \times 10^{-4}$ m$^2$/s, the method comprising the steps of:

i) estimating or determining an even number of outlets of the distributor bar or estimating or determining a distance between two adjacent outlets, taking into account the line speed and a reactivity of the mixture; ii) calculating a length of the distributor bar based on said number or said distance; iii) calculating and manufacturing a distributor bar with the determined even number of outlets and the calculated length and said predefined flow rate for distributing said viscous foamable liquid mixture, using a method according to the first aspect.

The attentive reader will have noticed that in this method the characteristics of the distributor bar are no longer defined in terms of the distributor bar itself, but in terms of characteristics of the production line in which it is intended to be used.

It is noted that step (i) can be based on experience or experiments as described in relation to FIG. 20, where a plurality of measurements are performed with different line speeds, whereby for each line speed an appropriate reactivity of the mixture is chosen, and whereby the width of the deposited tracks and/or the distance between the deposited tracks is measured while they are still flowable, before the actual volume expansion begins. It is noted that the choice of "Nholes" or "d" is not critical provided that it is chosen sufficiently high, but a slight over-estimation is not problematic, while a slight under-estimation is problematic. The disadvantage of choosing a value which is slightly higher than required is a slight increase of fouling and simulation time. However, if the value of Nholes is chosen too small (see FIG. 20), the simulation may well succeed, and the distributor bar will provide a substantially constant flow rate leaving each exit hole, but the foamed product may still have knit lines, because the distance between the openings was too large in view of, in particular, the line speed and the reactivity of the mixture.

The step of performing measurements at increasing line speed while taking into account at the same time increased reactivity of the mixture, is believed to speed-up the design process enormously, and should not be under-estimated. Despite being a (highly) reactive mixture, it was found that, as far as the simulation of the flow inside the distributor bar is concerned, the mixture can be considered to be a viscous foamable liquid mixture with time-constant parameters (for example m, n) but non-Newtonian shear-thinning behavior, but the impact of the reactivity on the sideways spreading on the laminator, is taken into account in said experiments on the laminator, without increasing the complexity of the simulations inside the distributor bar. According to the present invention, there is a nice decoupling between both "worlds" (inside the distributor bar on the one hand, and outside of the distributor bar, on the laminator on the other hand). According to the present invention, a clear cut can be made between two worlds by considering the number of outlets or the distance between them as a given (fixed value) in the design-space of the distributor bar.

In a third aspect, the present invention provides a distributor bar having a central inlet for receiving a predefined viscous foamable liquid mixture at a predefined flow rate, and having a predefined even number of outlets fluidly connected to said inlet via a main channel, the number of outlets being spaced apart equidistantly over a predefined length, characterized in that the distributor bar has a geometry such that, when a ratio of the predefined flow rate entering the central inlet and the predefined length is at least $1.00 \times 10^{-4}$ m$^2$/s, the mixture will leave each of the outlets with an average velocity which is constant for each of the outlets within a predefined tolerance margin of at most +/−5%.

The geometry may be determined by a method according to the first or second aspect. Or in other words, this distributor bar is obtainable by a method according to the first aspect or second aspect. With "geometry" is meant in particular the shape and dimensions of the main channel and the shape and dimensions of the plurality of outlets.

It is an advantage of such a distributor bar that it will provide, (when used in the environment it was designed for) a plurality of partial streams having predefined characteristics (e.g. average output velocity substantially constant in the range of 2.5 to 3.5 m/s and constant for all outlets within a tolerance margin of +/−5%), because it is guaranteed that such streams will result in a homogenous foamed layer without voids or knit lines or inhomogenities, especially near the outer ends of the distributor bar.

It is an advantage of a distributor bar according to the present invention that it can be used in a production line having a relatively high speed laminator (e.g. at least 15 or 20 or 30 or 50 or 75 m/min), and even with reaction mixtures with a higher reactivity, without compromising on quality of the foamed product.

It is an advantage of particular embodiments of the distributor bar, e.g. when designed with a maximum residence time of about 150 ms, that it also has a decreased risk of fouling, corresponding to an increased useful lifetime (typically 2 hours) and a decreased down-time of a production line.

In a fourth aspect, the present invention provides a production line comprising: one or more mixing heads adapted for providing a non-Newtonian shear-thinning viscous foamable liquid mixture at a predefined flow rate; a laminator having a predefined width and being adapted for running at a line speed of at least 15 m/min; a distributor bar designed and manufactured according to the first aspect, the distributor bar being connected via its inlet to said one or more mixing heads for receiving said viscous foamable liquid mixture and being mounted above said laminator for depositing said viscous foamable liquid mixture on said laminator via its outlets; a ratio of the predefined flow rate over the laminator width being at least $1.00 \times 10^{-4}$ m$^2$/s.

Such a production line is ideally suited for producing high quality sandwich panels, and/or isolation panels, with a substantially uniform density and without any knit lines or knit planes even at a relative high laminator speed of at least 15 m/min, or at least 20 m/min, or even higher.

In an embodiment of the production line, the laminator is adapted for running at a line speed of at least 20 m/min, or at least 25 m/min, or at least 30 m/min, or at least 35 m/min, or at least 40 m/min, or at least 45 m/min, or at least 50 m/min.

Especially production lines with high laminator speed benefit the most from the present invention, because quality of the foamed product can be guaranteed.

In a fifth aspect, the present invention provides a computer program product for designing and manufacturing a distributor bar according to the first aspect, when being executed on a computer system comprising a computing device and a computer-controllable manufacturing device; characterized in that: the computing device comprising a Computational Fluid Dynamics simulation (CFD) software, and driver software for controlling said manufacturing device; and software code fragments for performing at least steps (d), (e) and (f) of the method.

If is an advantage of such computer program product that it can be used both for designing a particular device as well as producing it. This is fast, convenient, and the risk of inconsistencies or compatibility-problems is reduced or minimized. This is ideally suited for rapid prototyping.

In an embodiment of the computer program product, the computer controllable manufacturing device is selected from the group consisting of: a computer controlled injection molding device, a computer controlled stereo-lithography additive manufacturing device, a computer controlled Fused deposition modeling additive manufacturing device, and a Computer numerical control (CNC) milling apparatus.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 4 illustrates a problem of a prior art distributor bar, whereby the width of the outer tracks is smaller than the width of the other tracks. The distributor bar is shown in front view, the tracks of viscous foamable liquid mixture are shown in top view.

FIG. 5 shows a cross-section of the tracks of FIG. 4 in a plane perpendicular to the laminator, at a first (short) distance from the distributor bar.

FIG. 6 shows a cross-section of the tracks of FIG. 4 in a plane perpendicular to the laminator, at a second (larger) distance from the distributor bar, after the viscous foamable material has had time to flow laterally on the laminator, but is no longer flowable.

FIG. 7 shows a cross-section of the expanded foam material, at a third distance from the distributor bar, after foaming of the layer of FIG. 6 between two continuous belt systems.

FIG. 8 illustrates the tracks all having substantially the same width (within a predefined tolerance margin of e.g. +/−5%). The distributor bar is shown in front view (FIG. 8—top), the tracks of viscous foamable liquid mixture (FIG. 8—below) are shown in top view.

FIG. 9 shows a cross-section of the tracks of FIG. 8 in a plane perpendicular to the laminator, at a first (short) distance from the distributor bar.

FIG. 10 shows a cross-section of the tracks of FIG. 9 in a plane perpendicular to the laminator, at a second (larger) distance from the distributor bar, after the tracks have had time to merge laterally while being flowable, so as to form a single uniform liquid layer before considerable foaming begins.

FIG. 11 shows a cross-section of the expanded foam material, at a third distance from the distributor bar, after foaming of the uniform mixture layer of FIG. 10 between two continuous belt systems.

FIG. 13 shows the results of shear stress measurements of a particular viscous foamable liquid mixture directly after mixing. The particular mixture has a shear thinning behavior, which can be characterized by the so-called "Power Law" with 'm'=1.10 and 'n'=0.79.

FIG. 14 shows equations of the "Power Law fluid", but also several other viscosity models that may be used in a method according to the present invention.

FIG. 21 shows a first embodiment of a distributor bar according to the present invention. The inner space (also referred to herein as "main chamber" or "main channel") of this bar is tapering towards its outer ends, the centre line of the inner space is substantially straight. The geometry and dimensions of parts of the distributor bar (e.g. the lengths L[i], i=1 to 12 of each outlet pipe) are specifically chosen according to a method of the present invention.

FIG. 22 shows part of the distributor bar of FIG. 21 in enlarged cross-sectional view. It also schematically shows an example of an exit velocity profile and the corresponding "average exit velocity" out of these holes.

FIG. 23 shows a first specific example of a distributor bar according to the first embodiment of the present invention, consisting of two "sub-bars" (also referred to herein as "devices") having 12 openings each, hence 24 openings in total. The geometry and dimensions of parts of the distributor bar (e.g. the length of each outlet pipe) are determined according to a method of the present invention.

Figure 1:
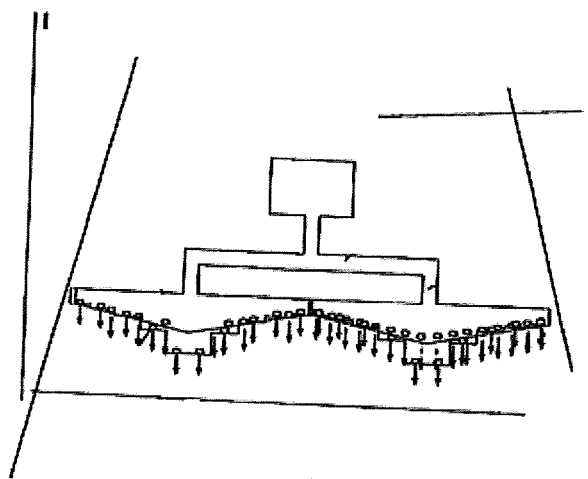
FIG. 1 shows a distributor bar for applying a viscous foamable liquid mixture onto a laminator, known in the art.
Figure 2:
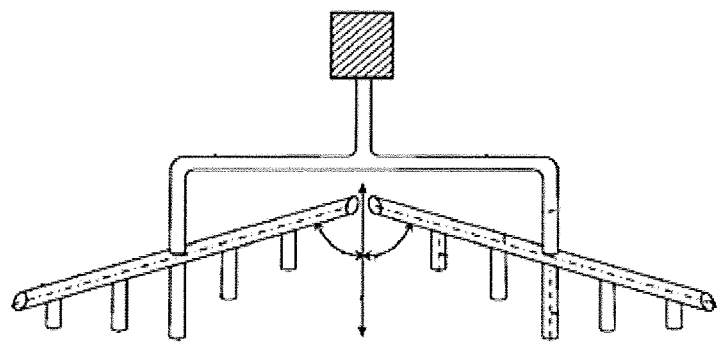
FIG. 2 shows another device comprising two casting rakes for applying a viscous foamable liquid mixture onto a laminator, known in the art. The casting rakes show an angle less than 80° w.r.t. the direction of movement of the laminator.
Figure 3:
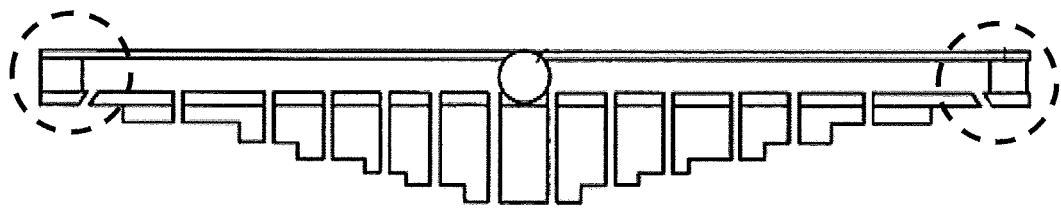
FIG. 3 shows yet another distributor bar for applying a viscous foamable liquid mixture onto a laminator, known in the art. This bar has inclined openings at its outer edges.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

A flow rate of 1 L/s (liter/second) corresponds to $1 \times 10^{-3}$ m$^3$/s.

In the present invention, the terms "laminator width" or "panel width" are used interchangeably.

In the present invention, the terms "laminator bar" or "distributor bar" are used interchangeably.

The length of the distributor bar "Lbar" is typically only slightly smaller than the laminator width "Wlaminator" it is intended to be used for. More specifically, if the distance between the parallel axes of two adjacent outlets of the distributor bar is "d", and the number of outlets of the distributor bar is "Nholes", then the length "Lbar" of a distributor bar according to the present invention is defined herein as Lbar=(Nholes−1)×d, being the distance between its outer outlets, while the width of the corresponding laminator "Wlaminator" is Wlaminator=(Nholes)×d. This assures that the outlets are distributed equidistantly over the laminator width.

In the present invention, the words "sub-bar" and "devices" are used as synonyms.

In the present invention, the term "cream time" is the time between mixing of the reactive components of the viscous foamable liquid mixture (e.g. the polyol component and the isocyanate component in case of polyurethane) and the commencement of the chemical reaction.

With "average exit velocity" of a non-constant velocity profile of a fluid flowing through a surface area, is meant a constant velocity value that provides the same flow rate.

When making a foam insulation panel the reaction components (e.g. polyol and isocyanate, and optionally one or more additives) are mixed together in a so called mixing head (not shown), and then the viscous foamable liquid mixture must be distributed over the width of the panel or laminator. Mixing heads are known in the art, and need not be further discussed here.

In the past this distribution over the width of the panel was done using an oscillating pour bar for relatively low line speed applications (e.g. less than 10 m/min) and multiple mix-heads, each connected to a corresponding pour bar, (usually two or three), for relatively high line speeds (e.g. about 30 m/min).

As the laminator line speed is increased, it is common to also increase the reactivity of the viscous foamable mixture, meaning that it has less time to foam than is the case with a slow line speed application (otherwise the length of the system would increase proportionally with the line speed), but this also means that the mixture will start foaming earlier.

It is a big technical challenge to transport the foam reacting mixture from the one or more mix-head(s) and to distribute it evenly over the width of the panel or laminator. It is furthermore a challenge to also ensure that the distributor bar does not foul quickly (e.g. is usable for at least a predefined time, e.g. at least two hours) and that the tracks/streams of reacting mixture, deposited as individual tracks on the laminator, quickly combine to form a single layer over the width of the panel. With "quickly" is meant that neighboring tracks must have merged while they are liquid, or in other words, before the point in time at which the reaction product is no longer flowable.

FIG. 4 to FIG. 7 illustrate an example of a non-ideal prior art distributor bar 40, the resulting deposited tracks (or streams) t1, t2, . . . , t12 of a viscous foamable material deposited on a laminator 51, and the resulting expanded foam material 71. These figures illustrate some typical problems that may occur in prior art systems if they are not optimally designed for a given production line.

Figure 4:
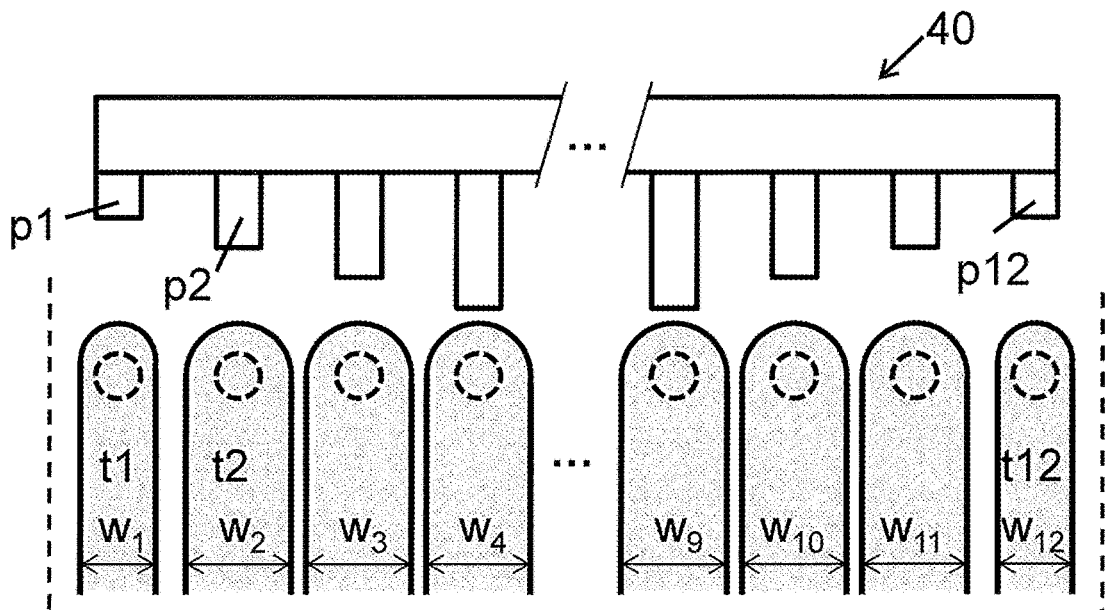
FIG. 4 to FIG. 7 illustrate an example of a prior art distributor bar (FIG. 4—top), the deposited tracks (or streams) of viscous foamable material on the laminator (FIG. 4—below), the tracks when the mixture is no longer flowable (FIG. 6), and the resulting foamed material (FIG. 7).
Figure 5:
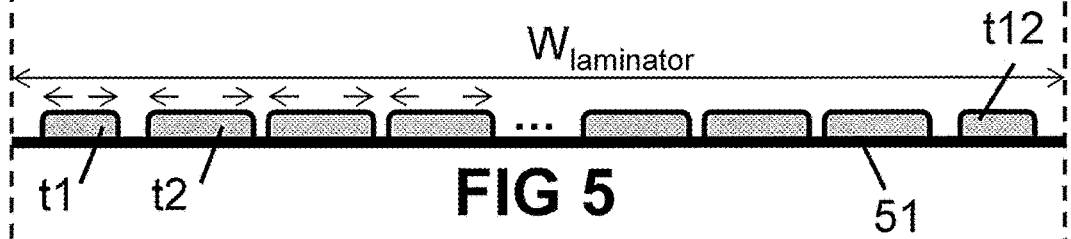
Figure 6:
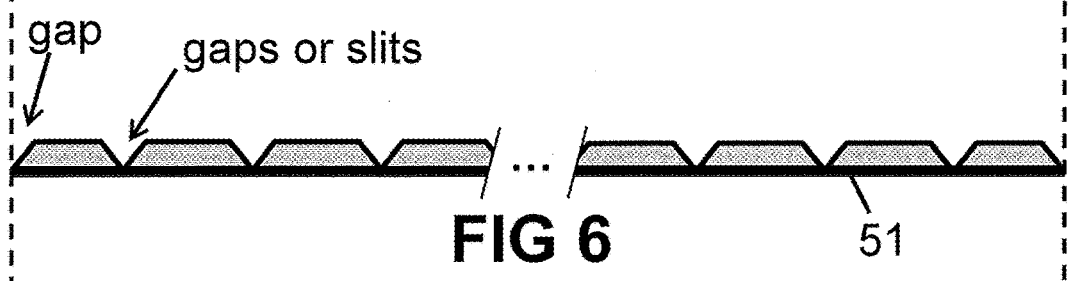
Figure 7:
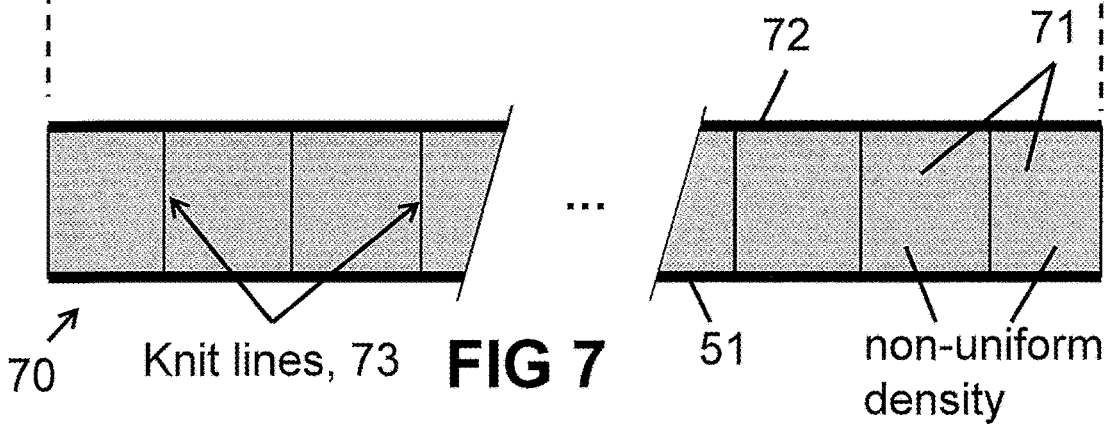

FIG. 4 shows a distributor bar 40 suspended above a moving laminator 51 (see FIG. 5 to FIG. 7). The distributor bar 40 of the example has twelve exit pipes p1, p2, . . . p12, eight of which are shown. A viscous foamable fluid mixture, e.g. a polyurethane (PU) mixture is provided to an inlet (not shown) in the middle of the distributor bar 40 at a suitable flow rate. It is known in the art how this flow rate can be calculated in function of the dimensions of the foamed panel to be formed, the laminator speed, the desired density, overfill factor, etc, and hence need not be described in more detail here, but is considered as a given value Qtotal, expressed in m³/s.

The viscous foamable fluid mixture inserted at the inlet of the distributor bar 40 then flows through an internal channel (like the one of FIG. 22) of the distributor bar 40 and leaves via one of the exit pipes p1-p12 to be deposited on the laminator 51. Ideally each exit pipe p1, p2, . . . p12 provides an identical fraction (q[i], i=1 to 12) of the total flow rate (Qtotal), and deposits identical liquid tracks (same width, same height) on the laminator 51. In practice, however, this is not always the case, and the flow rate of e.g. the outer exit pipes p1 and p12 is usually lower than that of the other exit pipes p2 to p11. The net result is that the outer tracks t1, t12 of viscous foamable mixture material laid down on the laminator 51 are narrower than the other tracks. This is especially visible at relatively fast laminator speeds, because for higher laminator speeds, moreover the reactivity of the viscous liquid mixture is increased.

FIG. 5 shows a cross-section of the tracks t1 to t12 deposited on the laminator 51, in a plane perpendicular to the laminator 51 and parallel to the distributor bar 40, shortly after being layed down on the laminator 51, i.e. as seen at a relatively small distance from the distributor bar (e.g. 10 cm). If the viscous foamable mixture is still sufficiently flowable, then the mixture will subsequently spread (at least to some extend) sideways (as indicated by the arrows) and will (at least partly) fill the gap on the outside of tracks t1 and t12, and the gaps between the tracks. If however the viscous foamable mixture was not sufficiently flowable, or if the distance between the exit pipes was too far (for the given production line), then the merge will not occur, and a cross-sectional view such as the one shown in FIG. 6 may result, whereby gaps and/or slits remain on the outside of the outer tracks t1, t12 and between the tracks t1 to t12. This is especially the case for relatively high-speed laminator lines (e.g. above 30 m/min, or above 50 m/min), because with these lines typically a higher reactive mixture is used, the deposited tracks of which will expand less in the sideway direction.

FIG. 7 shows the resulting expanded foamed layer 71 after expansion of the individual tracks of FIG. 6. Although the entire space between the lower laminator 51 and the upper belt system 72 will normally be completely filled (assuming a correct flow rate was applied by the mixing head), a non-ideal expanded foam will result, having e.g. a non-uniform density, especially at the outside, and having knit lines or knit planes where the individual expanded tracks of FIG. 6 will mechanically touch after expansion, but will not have formed a single layer because the mixture of the individual tracks of FIG. 6 were not merged while being fluid. The knit lines may become visible when the resulting layer 70 is cut, and they result in a decreased yield strength, which however may be acceptable for some applications, such as insulation panels without load bearing capacity. Although the problem is only shown here for the outer tracks t1 and t12, in practice the problems also occur for the other tracks t2 to t11, but is typically less pronounced.

It is noted that intuitively the skilled person, trying to solve the problems of the outer tracks t1, t12 as shown in FIG. 6, may be tempted to increase the diameter of the opening of the outer exit pipes p1, p12, but experience has shown that this does not lead to a good solution, because increasing said diameters influences the entire flow distribution rather than only increasing the flow rate through the outer exit pipes. This is an example why mere "trial and error" cannot lead to an optimal solution for a given production line.

Figure 8:
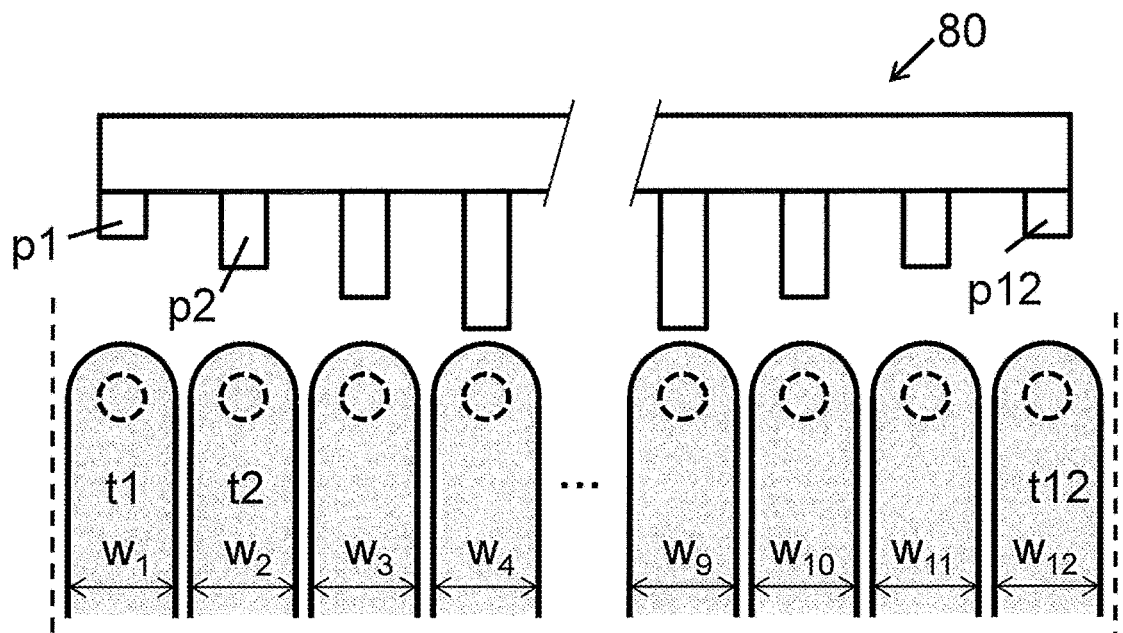
FIG. 8 to FIG. 11 illustrate an example of a distributor bar according to the present invention (FIG. 8—top), the deposited tracks of viscous foamable liquid material on the laminator (FIG. 9), a uniform layer obtained by lateral mixing of the tracks while being fluid (FIG. 10), and the resulting foamed material (FIG. 11).
Figure 9:
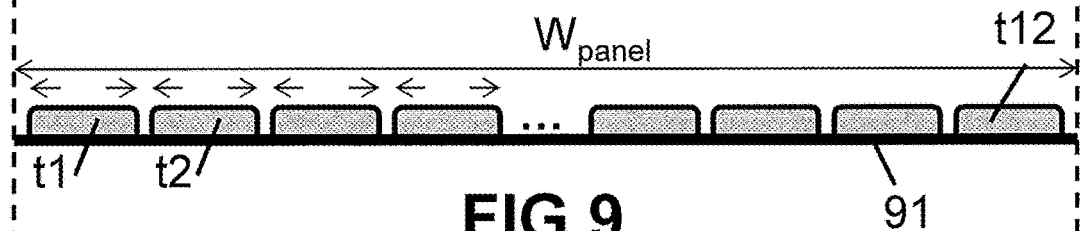
Figure 10:
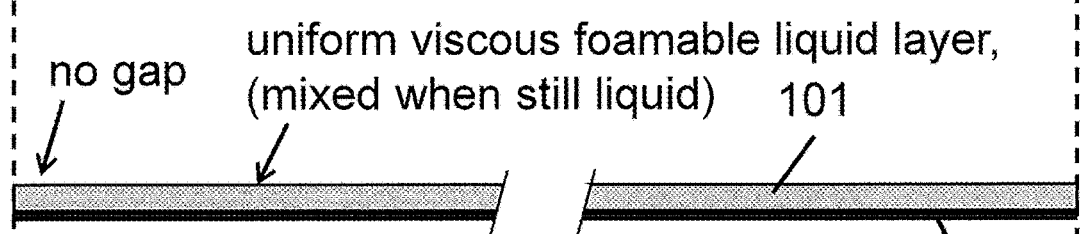
Figure 11:
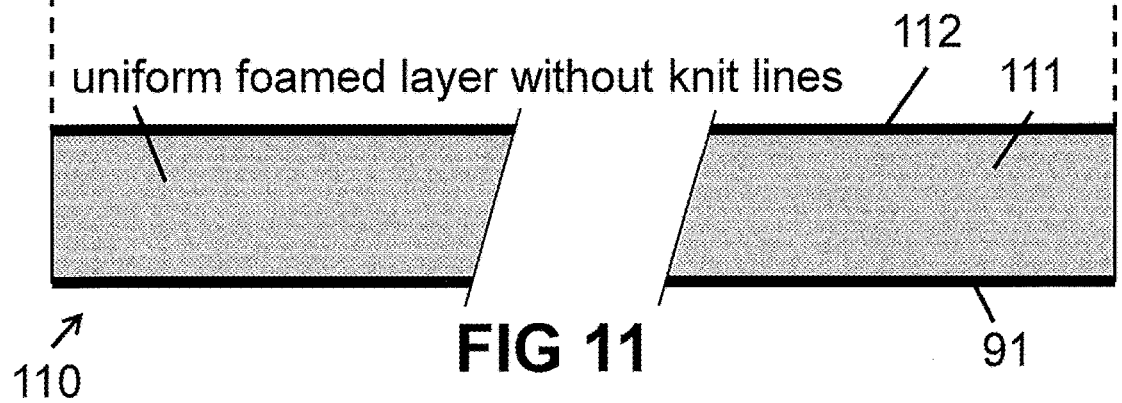

FIG. 8 illustrates a distributor bar 80 according to embodiments of the present invention, and FIG. 9 to FIG. 11 show what this distributor bar is able to achieve, during use. By using the design and manufacturing method in accordance with embodiments of the present invention, as described further, it can be guaranteed that the tracks t1-t12 shown in FIG. 8 (below) in top view, and FIG. 9 in cross-section, can be deposited on the laminator 91, in such a way that these tracks t1 to t12 will subsequently merge into a single substantially uniform liquid layer 101 (FIG. 10) extending over the entire laminator width Wpanel before the liquid mixture loses its flowability (or fluidity). As can be seen, all major artifacts as discussed in relation to FIG. 4 to FIG. 7 are solved, in particular the gaps between the tracks, and on the outside of the outer tracks t1 and t12 have disappeared, no knit lines are present anymore, and the density of the expanded foam layer 111 is substantially uniform.

While the desire or goal of obtaining a "uniform liquid layer" was already expressed in the prior art, it was not disclosed in detail how this goal can be achieved, nor do all underlying problems or relations seem to be fully understood or recognized. In particular for example, the prior art documents do not seem to mention the problems related to limited sideways expansion, and/or the link between an increased laminator speed & reactivity of the viscous foamable liquid mixture on the one hand and the minimum number of openings on the other hand. This makes that finding a solution that takes into account all these effects seems like an overwhelming problem, which is indeed the case for increased laminator speeds (e.g. above 30 m/min, or above 35 m/min, especially above 40 m/min, and higher, such as above 50 m/min). With "more reactive" mixtures is meant that these mixtures have a decreased cream time. There is a need for a systematic approach to tackle this problem.

Design and Manufacturing Method According to Embodiments of the Present Invention While distributor bars with a plurality of exit pipes, the exit pipes having a constant inner diameter but varying lengths, are known in the prior art, it is not known in the prior art how exactly these lengths of the exit pipes need to be chosen for a given production line, e.g. for a given panel width, flow rate, laminator speed, and a particular viscous foamable liquid mixture (e.g. a particular polyurethane PUR mixture, or polyisocyanurate PIR mixture), e.g. related to its chemical reactivity and its viscous behavior. Considering that distributor bars, especially those intended for use with high laminator speeds have at least twelve exit pipes, e.g. at least sixteen, e.g. at least twenty, e.g. at least twenty-four or even more this means that at least twelve length-values need to be determined. The underlying problem the inventors were facing can thus be formulated as (at least) a 12-dimensional optimization problem.

The approach the inventors took for calculating the dimensions of a distributor bar according to the present invention, can be roughly described as follows:

1) choosing a geometry for the distributor bar, and defining a set of parameters that fully characterizes the size and shape of the distributor bar. For example, in a first embodiment (see further), the possible set of parameters is proposed: "Ddev, α, W, Ndev, Nholes, Dhole, L[Nholes]", where L[Nholes] is an array of 12 values for the lengths of the 12 exit pipes, hence 6+12=18 values need to be determined.

2) choosing or calculating or estimating some of these parameters (but not the array of lengths), based on experiments and/or experience. One example is choosing a value for the ratio "α·Ddev" as the inner diameter of the tapering inner space at the outer ends and the value "Ddev" as the inner diameter at the center of the distributor bar, e.g. choosing α=0.75. Another example is estimating a suitable number of exit pipes "Nholes" to guarantee complete laydown on the laminator.

In addition to the pure geometrical parameters, the inventors found it useful to add another parameter, namely the average residence time of the viscous mixture inside the laminator bar, as it may help to choose suitable values for e.g. the inner diameter of the inner space 5, or in case the inner space does not have a circular cross section, for example the distance between opposite edges of a square or hexagonal or octagonal or polygonal cross section.

3) finding an analytical expression in only two parameters (e.g. parameter 'K' and 'a') to calculate the parameter which is different for each of the exit pipes (in the example above, the lengths L[i], i=1 to Nholes of the exit pipes). In this way, the twelve-dimensional problem (or sixteen or twenty dimensional problem) can be reduced to a two-dimensional problem, which is manageable.

4) An initial set of these two parameters (k0, a0) is calculated or estimated, and an array of (e.g. twelve) length-values L[i] (i=1 to 12) for the exit pipes is then calculated using the analytiscal expression of step 3). Together with the values calculated or estimated above, this completely specifies a first proposal of the geometry (e.g. shape and dimensions) of the laminator bar.

5) A Computational Fluid Dynamics simulation is performed to simulate the behavior of the mixture in the first proposed laminator bar. It turned out to be crucial that a non-Newtonian shear-thinning behavior for the viscous foamable fluid mixture is used. The simulation is then used to determine the output velocities v[Nholes] of the liquid mixture leaving each of the exit pipes, (or more exactly, the average output velocity of the simulated velocity profile, because the velocity is not constant). Optionally or additionally the simulation is also used to determine the average residence time "tdev" of the viscous foamable fluid mixture in the distributor bar.

6) It is then verified whether the simulated average output velocities "Vhole" of the above chosen geometry satisfies a predefined criterium, which, according to the present invention are that the average exit velocity of the fluid should be substantially constant within a predefined margin (e.g. within +/−5%) and must lie within a predefined range (e.g. in the range of 2.5 to 3.5 m/s). Optionally or additionally it may also be required that the average residence time "Tres" is smaller than a predefined value (e.g. 150 ms or 80 ms or another suitable value), and if any or both of these conditions are not satisfied, then the steps (2) to (6) may be repeated.

Once the parameters other than the lengths of the pipes (in this example) are determined, the steps (4) to (6) may be repeated, but instead of using the initial values (k0, a0) as originally calculated or estimated, now these parameters are varied within a range of e.g. +/−15%), for example in steps of 5%, resulting in 7×7−1=48 additional simulations, or in steps of 3%, resulting in 11×11−1=120 additional simulations, and the geometry providing the "best results" is then chosen as "the optimal" solution, whereby "best" may e.g. be defined as the solution yielding the smallest variation of the average output velocity. It is pointed out that multiple solutions exist, and that in fact all geometries that satisfy the predefined criterium (of average speed and/or residence time) are "good solutions", and other criteria for selecting one of them as the "best" are possible.

Figure 12:
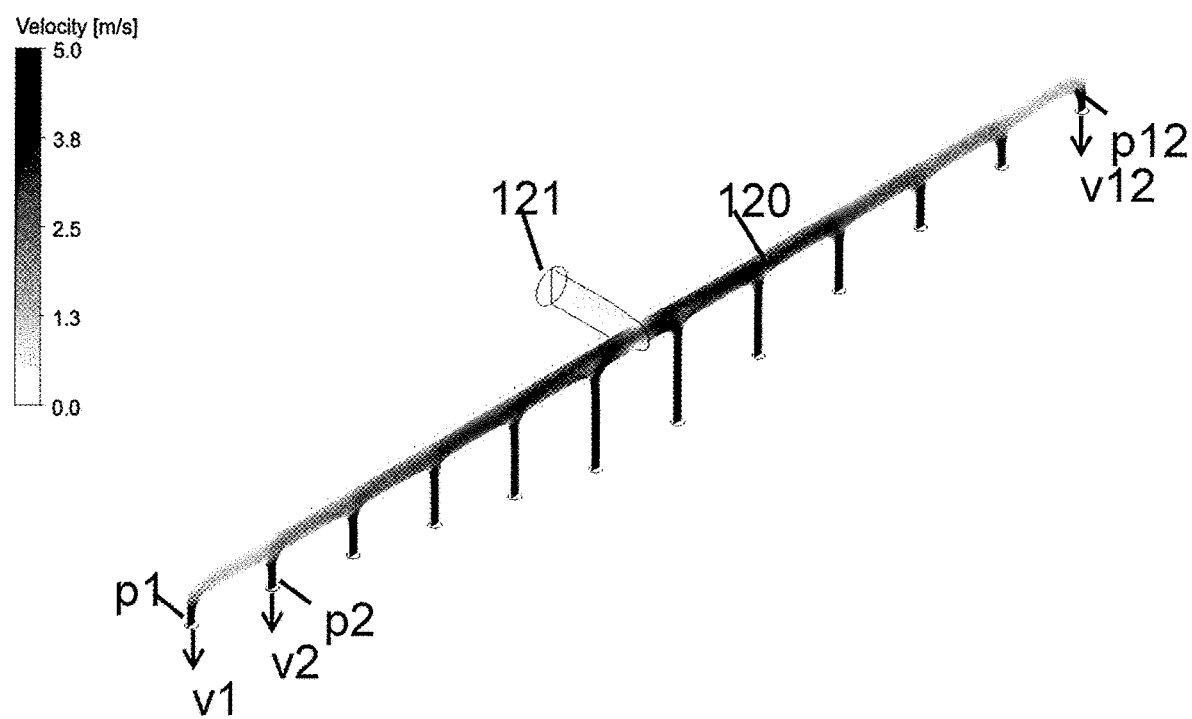
FIG. 12 is a drawing obtained from a computational fluid dynamics (CFD) computer simulation, as can be used in a method according to embodiments of the present invention.

FIG. 12 illustrates a simulation result using Computational Fluid Dynamics Analysis, using the program "Ansys-CFX", available from Ansys Inc., Version 15.0. It should be pointed out that, in the past, the inventors used the same approach, but instead of using a non-Newtonian shear-thinning behavior, it was assumed (or taken for granted) that the polyurethane liquid mixture behaved as a Newtonian viscous liquid (at least shortly after being mixed, while passing through the distributor bar), which behaviour was characterized by a simple viscosity value. A major problem with physical prototypes built based on these simulations was that the real-life measurements did not correspond very well with the computer-simulations. In particular, it was observed that a design of the distributor bar based on simulations assuming a Newtonian model for the viscous foamable liquid mixture resulted in narrower tracks, hence less material, at the ends of the distributor bar. Hence, mere use of Computational Fluid Dynamics Analysis did not lead to satisfactory results.

After many prototypes, the inventors came to the idea of further investigating the behavior of the viscous foamable liquid mixture. While this may be a relatively easy task for a non-foamable fluid, it is certainly not an easy task for a polyurethane mixture, because (i) the mixing components and mixing equipment are not present in the lab, but in a factory; (ii) because polyurethane tends to stick to the measuring equipment; (iii) the measurements need to be performed rather quickly, because polyurethane is a highly reactive mixture which starts to foam within about 10 seconds and with a volume expansion of about a factor 100; (iv) adding retarding agents would influence the measurement, so could not be added; (v) after each measurement the equipment needed to be thoroughly cleaned to remove any remaining mixture or foamed polyurethane. At the end of the description, more details are given about the viscosity measurements that were used, but of course, the present invention is not limited thereto, and other ways for determining the parameters may also be used.

FIG. 13 shows the results of the measurements. The graph shows that the polyurethane viscous liquid mixture did not behave like a Newtonian fluid, but was slightly "shear thinning". This result was very surprising, because, although it was clear that the behavior of PU-mixture would change dramatically over time, once the foaming reaction started, it was always taken for granted that the liquid mixture, at least in the period immediately after mixing the components (e.g. within 1.0 second), behaved like a Newtonian fluid. With this new insight, the computer-simulations were repeated, but this time taking into account the "shear thinning" behavior. In particular, the Ostwald de Waele model was used, with the values 'm'=1.10 and 'n'=0.79 (as obtained in the test of FIG. 13). New prototypes were built and evaluated, and this time the results showed a very good correspondence with the simulations, and no substantial differences in the track widths were observed anymore.

It is noted that in the measurements related to FIG. 13, the fluid was characterized by means of the so called "power law" formula of FIG. 14, and the parameters of 'm' and 'n' of the particular polyurethane mixture used were found to be about 1.10 and about 0.79 respectively, but of course, the invention is not limited to embodiments using only liquid mixtures having these values. Moreover, the "Power Law" is not the only possible way of characterizing non-Newtonian viscous foamable liquid mixtures, and other laws, such as e.g. "Cross", "Carreau Yasuda" and "Herschel Bulkley", the formulas of which are also shown in FIG. 14, may also be used. In fact, it is contemplated that any law or formula that characterizes the viscous foamable fluid mixture as a non-Newtonian shear-thinning fluid can be used, and may provide good results, such as for example the formulas of "Bingham", "Bird-Carreau" and "Casson".

Addition of Air

Air is often added to the mixture to aid nucleation of the foam when it is on the laminator. The addition of air modifies the initial viscosity. The power-law model can be modified as described in "M. D. Bessette and D. W. Sundstrom, Rheology of Model Polyurethanes, Polymer Process Engineering, 3(1&2), 25-35 (1985)" to account for the addition of air:

$$\mu = m\dot{\gamma}^{n-1}$$

$$m = \frac{m_0}{1 - 1.16\phi^{0.424}}$$

$$n = n_0 - 0.59\phi$$

Where $\phi$ is the volume fraction of air added. $m_0$ and $n_0$ are the power law parameters without the addition of air and are obtained from viscosity measurements, Modifying the viscosity model in this way helped to improve the flow distribution at the last hole.

Experiments

While the above should be sufficient for the skilled person to come to solutions proposed by the present invention, some aspects will be explained in even more detail.

First, referring to FIG. 15 to 20, it will be explained how a suitable value for the number of exit pipes "Nholes" can be chosen for a given production-line (panel width, flow rate, laminator speed, particular foamable mixture), for which the laminator bar is intended to be used.

Figures 15, 16, 17:
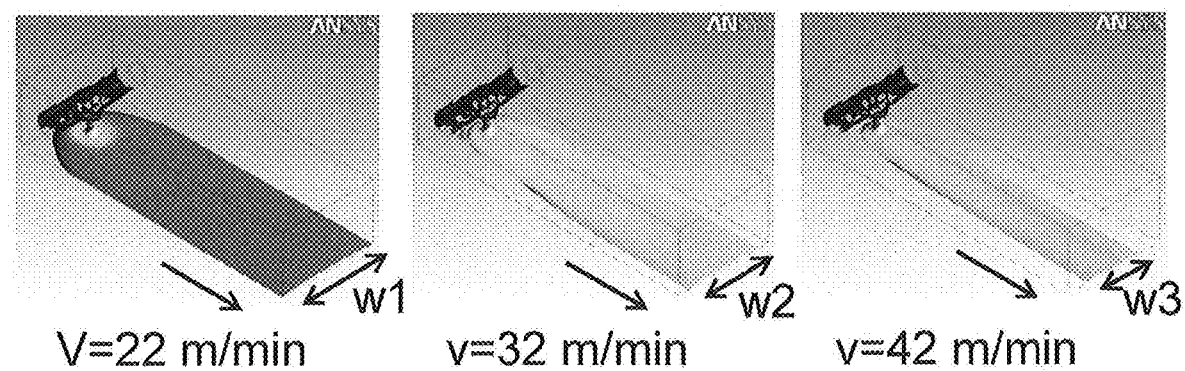
FIG. 15 to FIG. 17 show three simulation examples of a mixture track (or stream) formed by a viscous foamable liquid mixture, originating from a particular opening, when deposited on a laminator moving at a first speed (FIG. 15), second speed (FIG. 16) and third speed (FIG. 17). The resulting track of FIG. 15 is wider than that of FIG. 16, which in turn is wider than that of FIG. 17.

FIG. 15, FIG. 16 and FIG. 17 show examples of a single exit pipe having a particular diameter opening "Dhole", providing a track (or stream) of a viscous foamable liquid mixture on a laminator moving at a speed v of about 22 m/min, 32 m/min and 42 m/min respectively. In these examples, the flow rate of the liquid was kept constant (resulting in foam panels with a decreased thickness). As can be seen, the width w1, w2, w3 of the deposited viscous foamable mixture track, decreases as the laminator speed increases. The total output flow rate (Qtotal) for a 24 hole design for these examples was 0.045 m³/min. The diameter of the opening was 3.7 mm giving an average exit velocity (of the viscous foamable liquid out of the distributor bar) of 3.0 m/s. Increasing the speed of the laminator at the same total output (i.e. flow rate) is equivalent to making boards with decreasing thickness. Therefore, making thinner boards at higher speed will results in narrower tracks. Therefore, to obtain at uniform mixture (merge tracks) at higher speeds requires less distance between holes and therefore, more holes. These simulations assumed equal reactivity but in general the reactivity will increased (making the issue more critical) with line speed as the time between mixing head and conveyor is shortened.

This means that, in practice, the lateral spread of the mixture decreases as the line speed increases by two factors: the line speed and the reactivity. This relationship does not seem to have been taken into account in the prior art disclosures. This is important, however, because the deposited tracks (as shown in FIG. 9) need to merge while they are still liquid and movable (or flowable), in order to obtain the single uniform mixture layer of FIG. 10.

Figure 18:
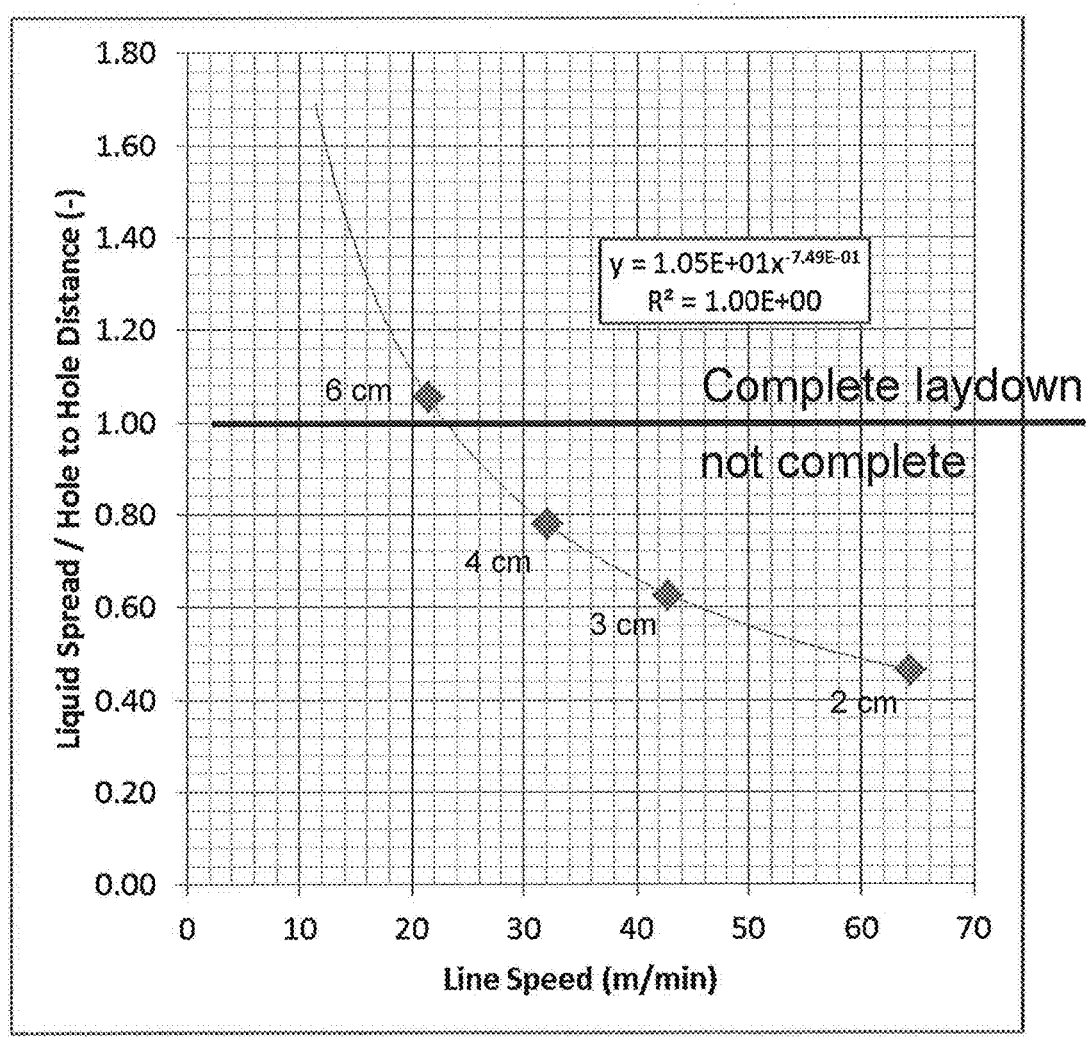
FIG. 18 shows the examples of FIG. 15 to FIG. 17 in a graph. The vertical axis maps this data to a hole-to-hole distance of about 50 mm.

FIG. 18 shows an example of an experiment with a specific flow rate and a specific exit opening diameter. As can be seen, for a laminator speed v of about 22 m/min, the track width was about 6 cm, for speed v=32 m/min the width w=4 cm, for speed v=43 m/min the width w=3 cm, and for speed v=64 m/min the width w=2 cm. This means that, in this specific example, if the exit pipes are located at a distance of about 5.8 cm, the mixture tracks on the laminator will merge for a laminator speed of less than about 23 m/min (part of the curve above the "critical line"), resulting in the merged liquid layer of FIG. 10 and subsequently in the uniform foamed layer of FIG. 11. In contrast, for laminator speeds above about 23 m/min (part of the curve below the critical line), the deposited mixture tracks on the laminator will not merge and in fact leave gaps between the tracks as shown in FIG. 6, and will ultimately result in an expanded foam like that of FIG. 7, which is undesirable.

Hence, if the panel width and flow rate are given, the maximum distance 'dmax' between the exit pipes can be determined using curves such as that of FIG. 18. It is preferred to choose an even number of exit pipes, evenly distributed over the distributor bar, i.e. at a constant distance from each other. Hence, in the example of FIG. 18, a number of exit pipes should be chosen that results in a distance between the exit pipes smaller than 5.8 cm.

Figure 19:
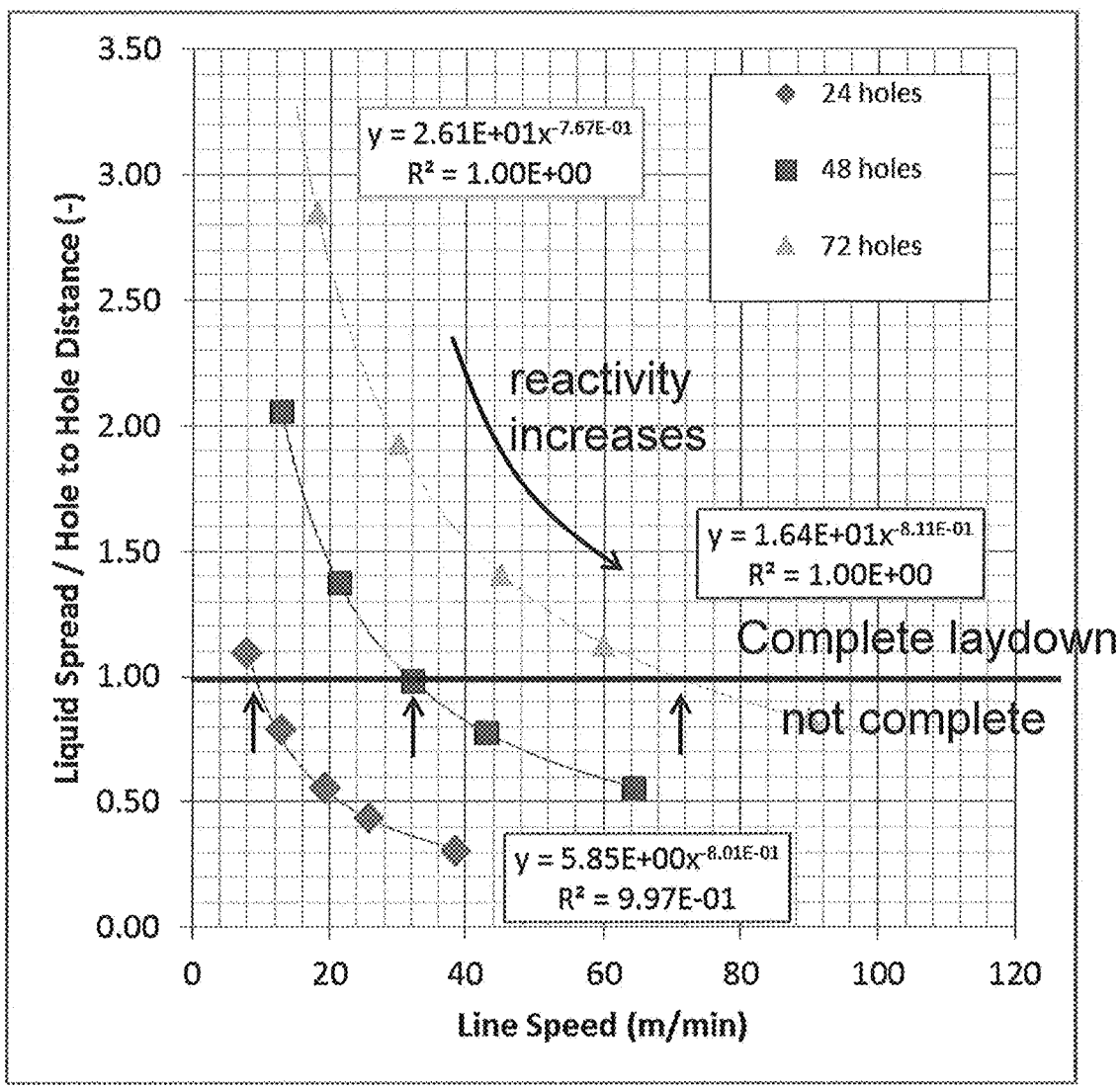
FIG. 19 is a combination of three graphs similar to that of FIG. 18, for three different distributor bars, a first bar having 24 holes each having a first diameter of 3.7 mm, a second bar with 48 holes each having a second diameter of 2.6 mm, and a third bar with 72 holes each having a third diameter of 2.1 mm. Again, for each curve, a more reactive mixture was used as the line speed increases. It is noted that this graph thus not only takes into account laminator line speed, but also (typical) reactivity of the mixture and (typical) exit diameters of the opening of the distributor bar. The horizontal line indicates where the lateral spread of the deposited mixture equals the distance between neighboring holes (or openings or pipes). Above this line, a uniform mixture layer is formed (see FIG. 10). Below this line, separate tracks with gaps are formed (see FIG. 6).

FIG. 19 shows similar plots as the one of FIG. 18. The situation for three distributor bars is shown, the first distributor bar (diamonds) having 24 exit pipes, the second distributor bar (squares) having 48 exit pipes, the third distributor bar (triangles) having 72 exit pipes. As can be seen, the max. laminator speed when using the first distributor bar (with 24 exit holes) is about 8 m/min; the max. laminator speed when using the second distributor bar (with 48 exit holes) is about 32 m/min; the max. laminator speed when using the third distributor bar (with 72 exit holes) is about 72 m/min, in order to obtain a complete laydown.

Figure 20:
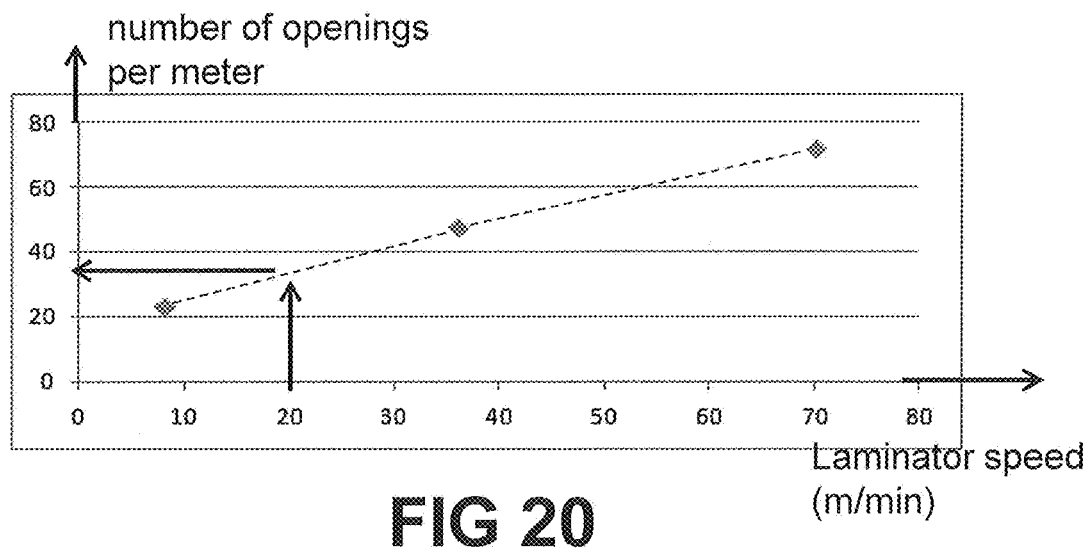
FIG. 20 is a simple graph showing the minimum number of openings per meter length of the distributor bar as a function of laminator line speed, as can be derived from FIG. 19 (on or above the line of "complete laydown"). This graph can subsequently be used as a rule of thumb for estimating a minimum number of openings for any laminator speed.

FIG. 20 graphically represents these minimum number of exit holes (obtained from FIG. 19) as a function of the laminator line speed. It is important to realize that this graph not only takes into account laminator line speed, but also (typical) reactivity of the mixture and (typical) exit diameters of the opening of the distributor bar. Despite its simplicity, this graph reduces the complexity of the multi-dimensional problem considerably, because it allows the aspect of "laminator line speed" and "reactivity of the viscous foamable mixture" to be "incorporated" in the parameter Nholes. The benefits of this approach should not be under-estimated.

Actually, it also turned out that the value of Nholes is the "key" to transform the problem in the domain of the production line (with requirements such as: total flow rate, laminator width, laminator speed, reactivity and viscosity of the mixture) into a problem in the domain of the distributor bar (with a given number of outlets, and with requirements such as: total flow rate, length of the bar and viscosity of the mixture).

In other words, the parameter "Nholes" (being a variable in the problem space of the production-line, but being a given in the problem space of the distributor bar), allows to formulate the design of the distributor bar without referring to line-speed and/or reactivity of the mixture.

It is noted that, for a given length of the distributor bar, the number of holes "Nholes" is related to the distance between adjacent outlets, hence, everything which is stated above for the parameter "Nholes" is also true for the parameter "d", which can thus also be considered as the "key" to translate the problem from the "production-line" to the "distributor bar".

Once this graph is known, it can then be used for estimating (as a kind of "rule of thumb") a minimum number of exit pipes required for any given laminator line-speed, and any corresponding reactivity. For example, if the target speed is chosen as 20 m/min, then at least about 36 exit holes should be chosen in order to obtain the uniform merged layer of FIG. 10 and expanded foam of FIG. 11. It is usually not beneficial to choose the number of exit openings much higher (for example more than 4 higher) than this minimum number, because it will typically result in a solution having a slightly higher average residence time of the mixture in the distributor bar, hence will slightly increase the risk of fouling, or in other words, will result in a slightly increased down-time.

It is noted that, while FIG. 19 refers to "a" distributor bar having 72 holes for distributing a total flow rate $Q_{total}$ (implicit), this may in practice be realized by e.g. three individual but cooperating distributor bars (further referred to herein as "sub-bars" or "devices"), each covering one third of the panel width, and each having a flow rate of one third of $Q_{total}$. Preferably in this case also three mixing heads are used for keeping the distance and hence the time between the mixing head and each of the laminator bars to a minimum. In the present invention, however, the combination of two or more of such individual distributor bars cooperating on a single laminator, are considered as a single distributor bar.

Four Embodiments

Four different types of distributor bars according to embodiments of the present invention are proposed, although the present invention is not limited thereto, and other embodiments are also envisioned. These four types will be described in more detail further, along with guidelines and/or analytical formulas for calculating or estimating an initial set of parameters. And for each prototype a parameterized analytical expression will be given to calculate the variable parameter of the exit pipes (i.e. "length" in the first three embodiments and "area" in the fourth embodiment). All types can be designed and manufactured using the same method (apart from some minor differences), and have as a common feature that they provide a physical distributor bar which—in operation—, when a viscous foamable liquid mixture is entering its inlet at a predefined flow rate, the distributor bar will provide a plurality of partial streams, each having a substantially constant exit velocity within a predefined tolerance margin (e.g. +/−5%) and within a predefined range (e.g. 2.5 to 3.5 m/s), and optionally or additionally also with an average residence time of the mixture inside the distributor bar of less than a predefined value (e.g. less than 150 ms, or less than 80 ms, or any other suitable value).

Hence, the different embodiments of the present invention solve a common problem, and provide a solution which results in the advantages mentioned above, in particular:
  stated in the problem space of the distributor bar: providing N partial streams having a substantially constant output velocity within +/−5% (or less), and optionally or additionally also reduced fouling.
  stated in the problem space of the production-line: providing complete laydown (without gaps), uniform expanded foam material (without knit lines), and optionally or additionally also reduced fouling of the distributor bar.

First Embodiment

FIG. 21 to FIG. 26 illustrate several examples of a first embodiment of a distributor bar according to the present invention, dedicated for particular production-lines.

The geometry of the distributor bar 210, 230, 240, 250, 260 of the first embodiment is chosen to have an inner space 5 (or "main channel") with a substantially straight center line 6 (in its longitudinal direction). The inner space 5 of the distributor bar is tapering towards its outer ends (excluding the exit pipes, which have a constant inner diameter Dhole), whereby the inner diameter decreases (e.g. linearly) from a first value Ddev near the inlet to a second value α·Ddev at the outer ends (left and right in FIG. 22), where α is a constant value chosen in the range from 0.50 to 0.95, preferably in the range from 0.60 to 0.95, more preferably in the range of 0.75 to 0.80. The main reason for reduction of Ddev to αDdev is to reduce residence time and maintain a minimum speed to mitigate against fouling. This must be balanced against making it more difficult to distribute the flow evenly. Values of a in the range mentioned above provide a good balance.

The distributor bar further has a central inlet 2 for receiving a viscous foamable fluid mixture from mixing equipment (not shown), and it has an even number Nholes of exit pipes spaced apart equidistantly with a distance 'd'. The exit pipes have a constant internal diameter Dhole which is the same for all exit pipes, and the exit pipes are arranged in parallel with their central axes perpendicular to the central axis of the main channel.

If the inner volume 5 (see FIG. 22) would have a constant diameter, then the average speed of the fluid traveling towards the outer ends would decrease from the center of the bar towards the outer ends, and hence the average residence time would also increase, and the fouling of the distributor bar would also increase. By choosing a bar with a tapering inner space 5, this speed reduction is somewhat reduced, the inner volume is reduced, the average residence time is reduced, and the fouling is reduced.

Preferably the inner diameter decreases linearly from a value Ddev at the center to a value α·Ddev at the outer ends because that is easy to simulate and to produce, but this is not absolutely required for achieving the advantageous effects of the present invention, and other smooth transition functions may also be used, for example, the cross-sectional area of the inner space 5 may be varied linearly from $\pi \cdot Ddev^2/4$ at the center to $\alpha \cdot \pi \cdot Ddev^2/4$ at the outer ends.

Distributor bars according to the first embodiment can then be represented by the following set of parameters (see FIG. 21 and FIG. 22):

Nholes denoting the total number of holes (exit pipes) in the distributor bar, (as discussed above, "Nholes" is considered a "variable" or a "given", depending on the problem space), Ndev denoting the number of devices (or "cooperating sub-bars") together forming "the" distributor bar, Ddev denoting the internal diameter of the main chamber 5, at the inlet of the device (i.e. the tapered inner volume 5, excluding the exit pipes), α·Ddev denoting the internal diameter of the main chamber of the device (i.e. the tapered inner volume, excluding the exit pipes), at its outer ends, Dhole denoting the internal diameter of the exit holes (exit pipes), α denoting the ratio of the internal diameter of the main chamber at its outer ends versus the internal diameter at the center location, W denoting the distance between the centers of half the number of exit pipes of one device, L[1], L[2], . . . , L[Nholes] denoting the lengths of the exit pipes.

which parameters are to be determined, e.g. optimized for a specific production line/distributor bar.

The production line itself can be characterized by the following set of parameters:

Qtotal denoting the total flow rate through the distributor bar (or through all the "devices" if there are multiple "cooperating sub-bars"), Wpanel denoting the total width of the panel to be manufactured, particular viscous foamable liquid mixture, e.g. PUR or PIR, (having a particular reactivity and a particular viscosity behavior), Vline denoting the line-speed of the laminator in the production line.

It is noted that the number of mixing heads is not considered to be given, but is assumed to be equal to the number of "devices" of the distributor bar, which number is to be determined as part of the method.

Detailed Possible Approach

A possible approach to determine the parameters of the distributor bar, is the following:

a) It is assumed that the production-line parameters, in particular e.g. panel width Wpanel, flow rate Qtotal, line speed Vline, as well as a particular viscous foamable liquid mixture is given.

b) Estimate a suitable even number Nholes of exit pipes, (taking into account the reactivity of the mixture for that particular line speed), e.g. based on experimental data such as given by FIG. 20, and choosing a suitable number of devices Ndev. If the number of exit openings is larger than for example 24, the distributor bar may be partitioned in multiple devices. If needed, the estimated number of exit pipes can be slightly increased so that each device has the same (and even) number of exit pipes. The number of exit pipes per device is preferably chosen in the range of 12 to 24. Increasing the number of devices (assuming each has its own mixing head) decreases the average residence time of the viscous foamable liquid mixture in each device, and hence the risk of fouling.

As explained above, once the number of outlets is chosen, the problem remaining to be solved is: for a given geometry (or mathematical model) of a distributor bar (for example the distributor bar shown in FIG. 21) and for a given incoming flow rate "Qtotal", and for a given length "Lbar", and a given viscous foamable mixture, to determine values of the variables of the mathematical model (in this example: Ddev, α, Dhole, W, L[1] to L[12]), such that the partial flow rates leaving each of the exit holes will be substantially constant within a predefined tolerance margin of at most +/−5%, when this distributor bar is physically realized and said mixture is injected at said flow rate Qtotal.

c) choose a suitable non-Newtonian shear-thinning model for the mixture, e.g. the "power law" (see FIG. 14), and determine (e.g. measure) the viscosity parameters of this model for that particular mixture. For example, for the mixture discussed in relation to the example of FIG. 13, the values obtained by measurement were found to be: 'm'=1.10 and 'n'=0.79.

d) Choose a suitable value for the ratio 'α', for example 0.75 or 0.80. It was experimentally found that values of a of about 0.75 or about 0.80 provide a good compromise. For values of a higher than e.g. 0.90, the length of all the exit pipes would decrease, but the average residence time of the mixture inside the distributor bar (or devices) would increase, which increases the risk of fouling, which is undesirable. For values of α lower than e.g. 0.65, the length of all the exit pipes would increase, so that the distance between the laminator and the distributor bar would increase, which increases the risk of splashing and inclusion of air bubbles, which is also undesirable.

e) Calculate the value W according to the following formula, which is equivalent to expressing that the exit pipes should be distributed equidistantly over the panel width:

$$W = \frac{W_{panel}}{2N_{dev}} \frac{N_{holes} - 2N_{dev}}{N_{holes}} \quad [1]$$

f) choose a value for Ddev and calculate a corresponding estimate for the residence time tdev according to the following formula:

$$t_{dev} = \frac{\pi}{12} \frac{D_{dev}^2 W_{panel}/N_{dev}(1 + \alpha + \alpha^2)}{Q_{total}/N_{dev}} \quad [2]$$

such that the average residence time is less than 150 ms for a relatively slow line speed or a relatively low flow rate (e.g. a line speed in the range of 10 m/min to 30 m/min or a total flow rate in the range of 0.20 L/s to 0.60 L/s), and smaller than 80 ms for a relatively fast line speed or a relatively high flow rate (e.g. 30 m/min to 100 m/min or a total flow rate of more than 0.60 L/s).

It was surprisingly found by the inventors that, for relatively high-speed lines or relatively high flow rates, decreasing the average residence time from a value as small as about 200 ms to less than 100 ms had a huge impact on the fouling of the devices. This was surprising, because it was not expected that the first fraction of a second after the mixing had such an impact on fouling, but apparently it does. Of course, the time & distance between the mixing head and the distributor bar should also be as small as possible. Values of Ddev are preferably chosen in the range of 6.0 mm to 15.0 mm, for example in the range of 8.0 mm to 13.0 mm (see the four examples below).

g) Choose a suitable value for Dhole and calculate an estimate for the average exit velocity Vexit such that the average velocity of the fluid leaving the exit pipe lies in the range of 2.5 to 3.5 m/s to prevent both fouling at the exit (not too small) and splashing on the laminator (not too high), using the formula:

$$v_{exit} = \frac{Q_{total}}{N_{holes} D_{hole}^2} \frac{4}{\pi} \quad [3]$$

Values of Dhole are preferably chosen in the range of 1.0 mm to 5.0 mm, for example in the range of 2.0 mm to 4.0 mm (see the four examples below).

h) Calculate the value 'K', representative for the length of the largest exit pipe, using the formula:

$$K = \frac{W}{3n} \left(\frac{D_{hole}}{D_{dev}}\right)^{3n+1} \left(\frac{N_{holes}}{2N_{dev}}\right)^n \left(\frac{\alpha^{-3n} - 1}{1 - \alpha}\right) \quad [4]$$

where α is the above-mentioned ratio of inner diameters, and n is the power law exponent of the viscous foamable mixture.

i) Calculate the distance "d" between two exit pipes using the formula:

$$d = W/(Nholes - 1) \quad [5]$$

j) Initialize the value of parameter 'K' to the value of 'K' calculated in step (h) and set the value of parameter 'a' equal to (n+1), where 'n' is the power law exponent of viscosity of the mixture, and calculate a set of lengths L[1], L[2], ..., L[Nholes] of the exit pipes using the following formula, whereby the value of z is set to integer multiples of the distance "d" calculated in step (i):

$$L(z) = L_{min} + k\left(\frac{z}{W}\right)^a \quad [6]$$

where Lmin is the length of the outer pipes, and can be chosen. Preferably the value for Lmin is chosen as small as possible (a.o. to save material cost), but it was found that if Lmin is chosen too small (e.g. less than 2.0 mm in some embodiments), the flow coming out of the pipes p1, p12 at the end of the distributor bar may be sideways, whereas for a slightly larger value of Lmin (e.g. larger than 2.0 mm), the flow coming out of the outer openings is straightened. Therefore Lmin is typically chosen in the range of 2.0 mm to 10.0 mm, for example in the range of 3.0 mm to 5.0 mm, but other values may also work. It was found that a value for Lmin of 4.0 mm is usually enough to straighten the flow.

k) In the simulation software, select the same non-Newtonian shear-thinning model as was chosen in step c), and apply the parameters found in step c), and Perform a Computational Fluid Dynamics simulation using the specific geometry (e.g. shape and dimensions) based on the values chosen or calculated above, and determine (by simulation) the (average) output velocities Vholes[1], Vholes[2], ..., Vholes[Nholes] for each of the exit openings, and calculate the variation of these exit velocities, and optionally or additionally also determine the (simulated) average residence time "Tres".

l) If the (simulated) exit velocities are outside the range of 2.5 to 3.5 m/s, and/or if the variation of the average exit velocities is higher than the predefined tolerance range (e.g. the minimum average velocity and the maximum average velocity deviate by 10%), and optionally or additionally if the simulated residence time Tres is too high (e.g. above the estimated value of 150 ms or 80 ms), then adjust one or more of the parameters determined (e.g. set or estimated or calculated or chosen) in steps (a) to (i).

m) Optionally, repeat steps j) and k) for slightly different values (k, a), where 'K' is chosen in the range of K+/−15%, and 'a' is chosen as (n+1)+/−15%, and for each simulation, determine the variance of the average exit velocity and/or the value of the average residence time.

n) Select one solution as the "optimum solution", e.g. the set of parameters (including the lengths of the exit pipes) yielding the smallest variation of exit velocities.

o) Build a physical distributor bar having the geometry (e.g. shape and dimensions) determined above.

Variations

Several variations of the above-mentioned procedure are possible.

For example, instead of simulating multiple combinations of (k, a) as mentioned in step (m), one can stop as soon as a satisfactory solution has been found. Of course a range larger or smaller than +/−15% can also be chosen. Instead of simulating all possible combinations (e.g. in steps of 5% or 3%), one may also use a predefined set of for example 25 couples (k, a) where the values of 'K' and 'a' are randomly chosen in the range of (K−15%) to (K+15%) and (n+1)−15% to (n+1)+15% respectively, etc.

Of course, one or more of the above steps (a) to (o) may also be executed in a different order, optionally including building intermediate prototypes, measuring the prototypes, and fine-tuning one or more parameters, etc.

Building a Physical Distributor Bar

The distributor bar specified and simulated above (as a mathematical model) in steps (a) to (n), can then be physically realized in step (o), e.g. prototyped and/or manufactured in any known manner, for example, but not limited to any of the following techniques:

1) Injection moulding using materials such as polyamide 6 (PA6) or acrylonitrile butadiene styrene (ABS). It is often reinforced with up to 30 wt % of glass fibre;

2) Stereolithography additive manufacturing (3D printing) using materials such as Tusk XC2700;

3) Fused deposition modeling additive manufacturing technique using materials such as ABS;

4) Computer numerical control (CNC) milling using materials such as aluminum or steel, or aluminum alloys or steel alloys or stainless steel.

Since the manufacturing step per se is well known in the art, no further explanation is deemed necessary.

Four numerical examples of distributor bars according to the first embodiment will be described next.

Example 1

The following parameters of the production line are given:
  Qtotal=$3.6 \times 10^{-4}$ m$^3$/s
  Wpanel=1.0 m
  n(fluid)=0.9
  Vline=15 m/min
Using steps (a) to (h) of the design method described above, the following set of parameters of a distributor bar 230 according to an embodiment of the present invention, shown in FIG. 23, were chosen or calculated:
  Ndev=2
  Nholes=12×2=24
  Ddev=$8.0 \times 10^{-3}$ m
  Dhole=$2.4 \times 10^{-4}$ m
  α=0.8
  tdev=0.11 s
  Vexit=3.3 m/s
  W=0.21 m
  K=$3.7 \times 10^{-2}$ m
These values can then be used for starting the simulations and iterations, and for calculating the lengths of the exit pipes.

It is pointed out that there is no unique solution for this production-line, and other solutions for this same production-line may also be possible, as explained above, and as can be appreciated by the steps of the proposed design method. For example if Ddev is chosen slightly smaller, say e.g. equal to about $7.0 \times 10^{-3}$ m, then a completely different solution would be obtained, but it would still offer the same guarantee of substantially "constant average speed" at the exit openings, or substantially constant partial flow rate leaving each of the exit openings (within the specified tolerance margin, when said reaction mixture would be inserted at the predefined flow rate. And when used in said production line, and if the value of "Nholes" was chosen sufficiently large (see for example FIG. 20) it would indeed "guarantee complete laydown" (no gaps between the tracks)", etc.

As another example, Ndev could have been chosen to be equal to 3, but that would require an additional mixing head, without a clear advantage, which in this case isn't required.

As yet another example, the number of exit holes Nholes could have chosen slightly larger than 24, for example 28 (since Ndev=2, a multiple of 4 has to be chosen), which would imply that the flow rate through each individual exit pipe would decrease by about 5%, which in this case would probably also be a good solution, because the average output velocities are still well within the range of 2.5 to 3.5 m/s, without a noticeable increase in the risk of fouling.

Example 2

Figure 24:
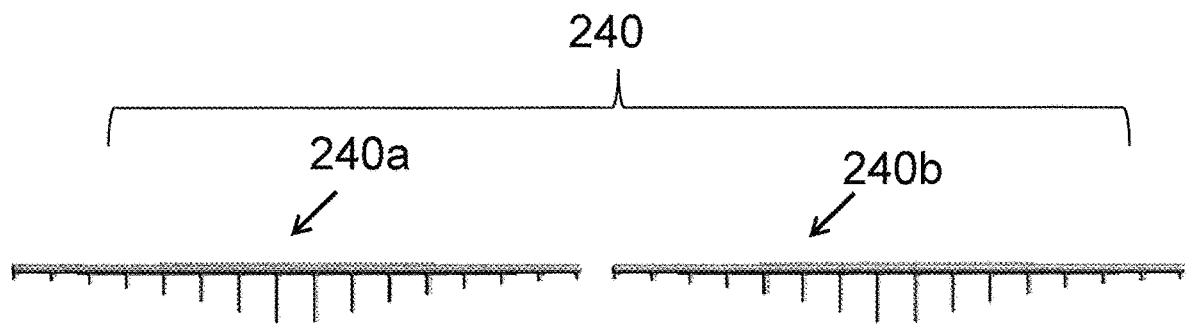
FIG. 24 shows a second specific example of a distributor bar according to the first embodiment of the present invention, consisting of two sub-bars (or devices) each having 16 openings, hence 32 openings in total. The geometry and dimensions of parts of the distributor bar (e.g. the length of each outlet pipe) are determined according to a method of the present invention.

In a second example, the following parameters of the production line are given:
  Qtotal=$4.7 \times 10^{-4}$ m$^3$/s, Wpanel=1.2 m, Vline=20 m/min, n(fluid)=0.9.
And a possible solution obtainable via the design method described above would be:
  Ndev=2, Nholes=16×2=32, Ddev=$8.5 \times 10^{-3}$ m, Dhole=$2.3 \times 10^{-4}$ m,
  α=0.8, tdev=0.12 s, Vexit=3.5 m/s, W=0.26 m, K=$41 \times 10^{-3}$ m.
Again, these values can then be used for starting the simulations, and for calculating the lengths of the exit pipes. This distribution bar 240 is illustrated in FIG. 24.

Example 3

Figure 25:
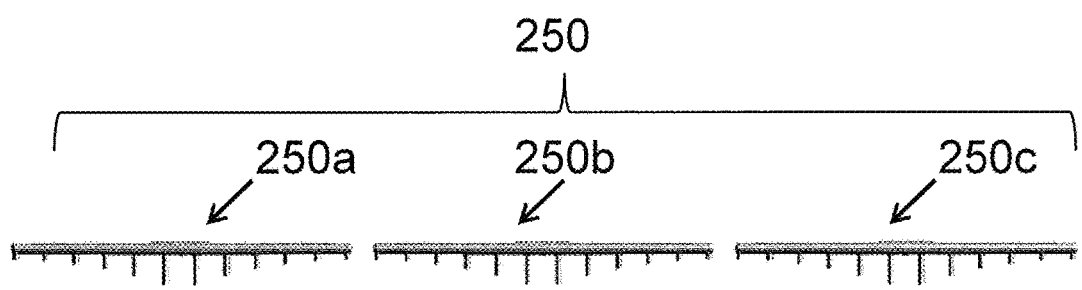
FIG. 25 shows a third specific example of a distributor bar according to the first embodiment of the present invention, consisting of three sub-bars (or devices) each having 12 openings, hence 36 openings in total. The geometry and dimensions of parts of the distributor bar (e.g. the length of each outlet pipe) are determined according to a method of the present invention.

In a third example, the following parameters of the production line are given:
  Qtotal=$1.2 \times 10^{-3}$ m$^3$/s, Wpanel=1.2 m, Vline=25 m/min, n(fluid)=0.8.
And a possible solution obtainable via the design method described above would be:
  Ndev=3, Nholes=12×3=36, Ddev=$11.5 \times 10^{-3}$ m, Dhole=$3.5 \times 10^{-3}$ m,
  α=0.75, tdev=0.083 s, Vexit=3.4 m/s, W=0.17 m, K=$25 \times 10^{-3}$ m.
Again, these values can then be used for starting the simulations, and for calculating the lengths of the exit pipes. This distribution bar 250 is illustrated in FIG. 25.

Example 4

In a fourth example, the following parameters of the production line are given:
  Qtotal=$1.5 \times 10^{-3}$ m$^3$/s, Wpanel=1.2 m, Vline=50 m/min, n(fluid)=0.8.

And a possible solution obtainable via the design method described above would be:

Ndev=3, Nholes=24×3=72, Ddev=12×10$^{-3}$ m, Dhole=3.0×10$^{-3}$ m,

α=0.75, tdev=0.072 s, Vexit=2.9 m/s, W=0.18 m, K=25×10$^{-3}$ m.

Figure 26:
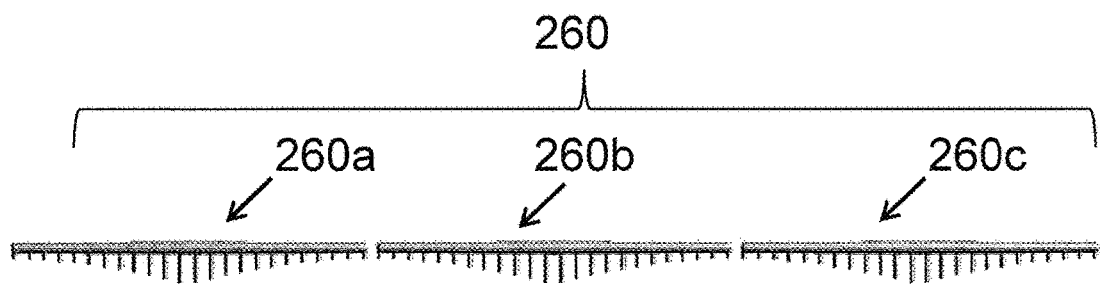
FIG. 26 shows a fourth specific example of a distributor bar according to the first embodiment of the present invention, consisting of three sub-bars (or devices) each having 24 openings, hence 72 openings in total. The geometry and dimensions of parts of the distributor bar (e.g. the length of each outlet pipe) are determined according to a method of the present invention.

Again, these values can then be used for starting the simulations, and for calculating the lengths of the exit pipes. This distribution bar 260 is illustrated in FIG. 26.

Second Embodiment

Figure 27:
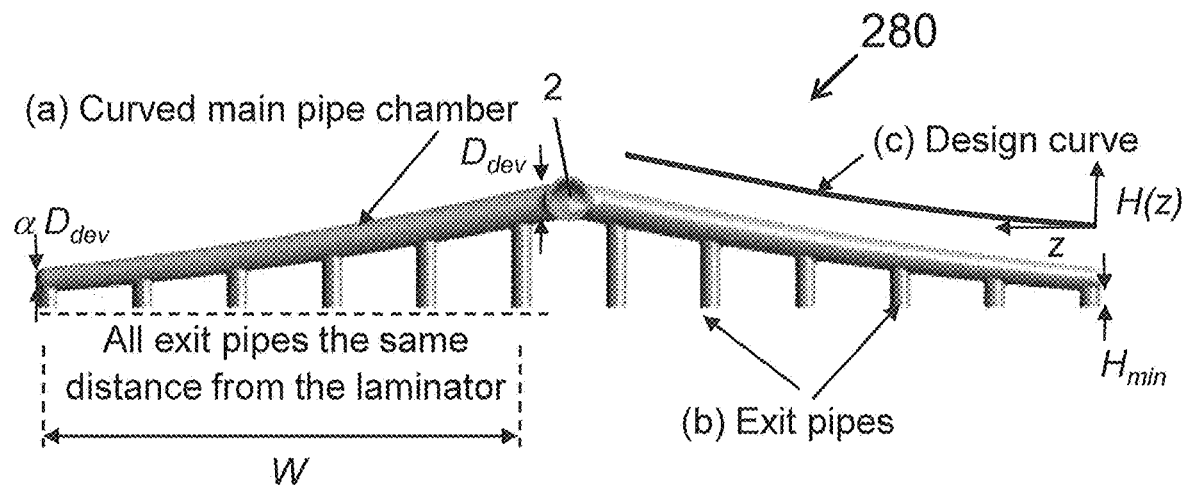
FIG. 27 shows an example of a second embodiment of a distributor bar according to the present invention. The inner space of this bar is tapering towards its outer ends, the centre line of the inner space is curved, and the exit pipes have different lengths. The geometry and dimensions of parts of the distributor bar (e.g. the curvature and the length of each outlet pipe) are determined according to a method of the present invention.

FIG. 27 illustrates an example of a second embodiment of a distributor bar 280 according to the present invention.

The geometry of the distributor bar 280 of the second embodiment is chosen to have an inner space 5 similar to that of FIG. 22, but with a curved center line (in its longitudinal direction). The inner space 5 of the distributor bar is tapering towards its outer ends (excluding the exit pipes, which have a constant inner diameter Dhole), whereby the inner diameter decreases from a first value Ddev near the central inlet to a second value α·Ddev at the outer ends (left and right in FIG. 27), where α is a constant value chosen in the range from 0.50 to 0.95, preferably in the range from 0.60 to 0.95, more preferably in the range of 0.75 to 0.80. The distributor bar 280 further has a central inlet 2 for receiving a viscous foamable fluid mixture from mixing equipment (not shown), and it has an even number of exit pipes spaced apart equidistantly and having parallel center lines. The exit pipes have a constant internal diameter Dhole which is the same for all exit pipes.

Everything which is said for the first embodiment is also applicable to the second embodiment, except as explicitly mentioned below.

Unlike the first embodiment, the distributor bar 280 of the second embodiment does not have an inner space with a straight center line, but its inner space is upwardly curved towards the center of the distributor bar 280. In addition to what was mentioned for the first embodiment, the curve is preferably chosen such that the bottoms of the exit pipes are substantially located in a single plane. This offers the additional advantage that, when mounted above a laminator, the distance between the laminator and the exit openings of the exit pipes is substantially constant.

The design method described above can also be applied for finding suitable dimensions for this laminator bar 280, except that formula [6] would have to be replaced by the following formula [7], where 'z' is a continuous value for defining the curvature.

$$H(z) = H_{min} + K\left(\frac{z}{W}\right)^a \quad [7]$$

whereby Hmin is the minimum height at the outer ends. What was mentioned above for Lmin is also applicable for Hmin. Hence, the value of Hmin is typically chosen in the range of 2.0 to 10.0 mm, preferably in the range of 3.0 mm to 5.0 mm, for example 4.0 mm.

Everything else which was said for the first embodiment is also applicable for the second embodiment, e.g. about the range of the residence time, the range of the exit speed, etc.

Third Embodiment

Figure 28:
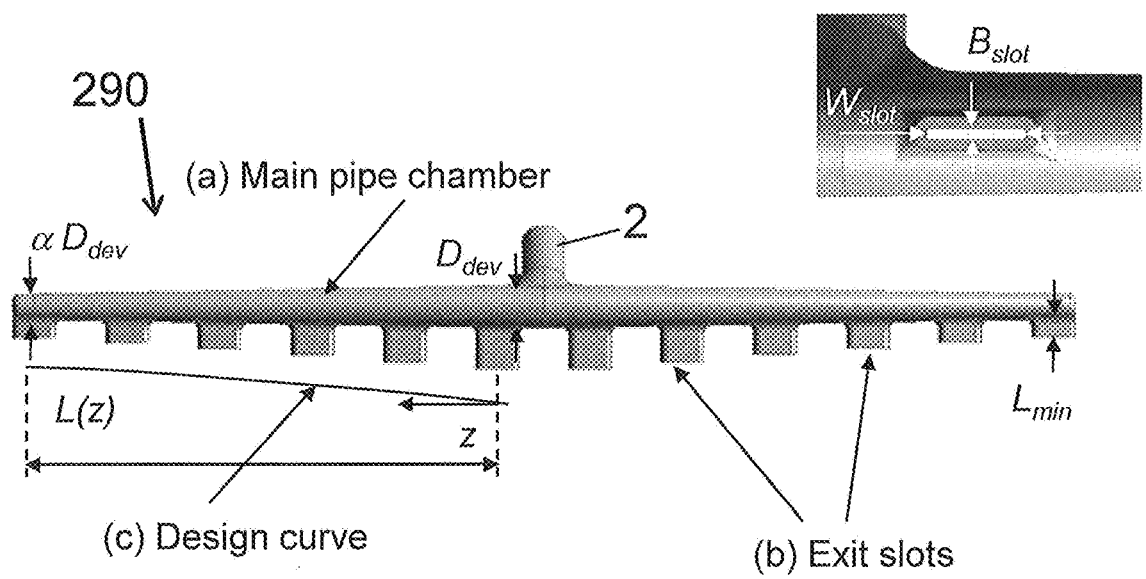
FIG. 28 shows a third embodiment of a distributor bar according to the present invention. The inner space of this bar is tapering towards its outer ends, the centre line of the inner space is substantially straight, and the exit pipes have the shape of elongated exit slots with a constant (e.g. rectangular or rectangular with rounded edges) cross-sectional area but the pipes have different lengths. The geometry and dimensions of parts of the distributor bar (e.g. the lengths of each pipe) are determined according to a method of the present invention.

FIG. 28 illustrates an example of a third embodiment of a distributor bar 290 according to the present invention.

The geometry of the distributor bar 290 of the third embodiment is chosen to have an inner space with a substantially straight center line (in its longitudinal direction). The inner space of the distributor bar 290 is tapering from the center towards its outer ends (excluding the exit pipes, which have a constant inner diameter), whereby the inner diameter linearly decreases from a first value Ddev near the central inlet 2 to a second value α·Ddev at the outer ends (left and right in FIG. 28), where a is a constant value chosen in the range from 0.50 to 0.95, preferably in the range from 0.60 to 0.95, more preferably in the range of 0.75 to 0.80. The distributor bar 290 further has a central inlet 2 for receiving a viscous foamable liquid mixture from mixing equipment (not shown), and it has an even number of exit pipes spaced apart equidistantly. Unlike the first embodiment, the distributor bar 290 of the third embodiment does not have cylindrical exit pipes with a circular opening, but has elongated exit slots with an elongated opening instead. The cross section of all the exit pipes is the same.

Everything which is said for the first embodiment is also applicable to the third embodiment, except as explicitly mentioned below.

Since the exit openings are not circular, but substantially rectangular with a cross-sectional area of Bslot×Wslot, the following formula [8] should be used instead of formula [3] when estimating the exit velocity:

$$v_{exit} = \frac{Q_{total}}{N_{slots}B_{slot}W_{slot}} \quad [8]$$

Everything else which was said for the first embodiment is also applicable for the third embodiment, e.g. about the range of the residence time, the range of the exit speed, etc.

Fourth Embodiment

Figure 29:
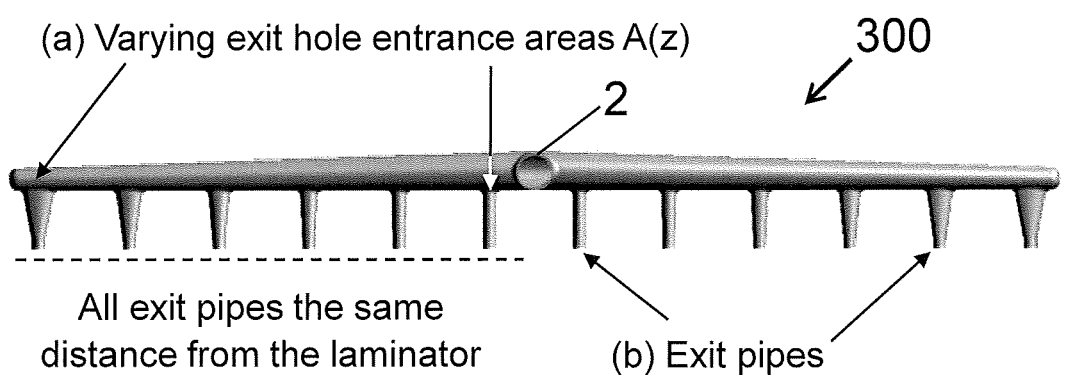
FIG. 29 shows a fourth embodiment of a distributor bar according to the present invention. It has conical exit pipes with a fixed length. The inner space of this bar is tapering towards its outer ends, the centre line of the inner space is substantially straight. The geometry and dimensions of parts of the distributor bar (e.g. the cross-sectional area of the exit pipes) are determined according to a method of the present invention.

FIG. 29 illustrates an example of a fourth embodiment of a distributor bar 300 according to the present invention.

The geometry of the distributor bar 300 of the fourth embodiment is chosen to have an inner space 5 with a substantially straight center line (in its longitudinal direction). The inner space of the distributor bar 300 is tapering from the center towards its outer ends (excluding the exit pipes), whereby the inner diameter linearly decreases from a first value Ddev near the central inlet to a second value α·Ddev at the outer ends (left and right in FIG. 29), where a is a constant value chosen in the range from 0.50 to 0.95, preferably in the range from 0.60 to 0.95, more preferably in the range of 0.75 to 0.80. The distributor bar 300 further has a central inlet 2 for receiving a viscous foamable fluid mixture from mixing equipment (not shown), and it has an even number of exit pipes spaced apart equidistantly. Unlike the first embodiment, the distributor bar 300 of the fourth embodiment does not have cylindrical exit pipes with a circular opening, but has funnel-like, e.g. conical exit cones of a fixed length instead.

Everything which is said for the first embodiment is also applicable to the fourth embodiment, except as explicitly mentioned below.

Instead of having to find a plurality of lengths of the exit pipes, in this embodiment one should find a suitable area of the funnel entrance for obtaining the constant exit velocity.

Hence, in the design-method as described above, formula [6] should be replaced by the following formula [9]:

$$A(z) = \frac{\pi}{4} D_{hole}^2 + K\left(\frac{z}{W}\right)^a, \qquad [9]$$

and instead of an array of lengths, now an array of areas has to be found.

Everything else which was said for the first embodiment is also applicable for the fourth embodiment, e.g. about the range of the residence time, the range of the exit speed, etc.

Variants

Although in all the above described embodiments, a main channel and exit pipes having a circular cross section was used, that is not absolutely required for the present invention, and the invention would also work with other cross sections, for example elliptical, triangular, triangular with rounded edges, square, square with rounded edges, rectangular, rectangular with rounded edges, pentagonal, pentagonal with rounded edges, hexagonal, hexagonal with rounded edges, octagonal, octagonal with rounded edges, polygonal, polygonal with rounded edges, or any other suitable shape.

It is also pointed out that it is not absolutely required that the cross section of the main channel and the cross section of the exit openings are the same, and indeed, they may be different. It is expected however that cross sections with sharp edges will result in faster fouling, and therefore cross section with a circular or elliptical shape, or a shape with rounded edges is preferred.

Figure 30:
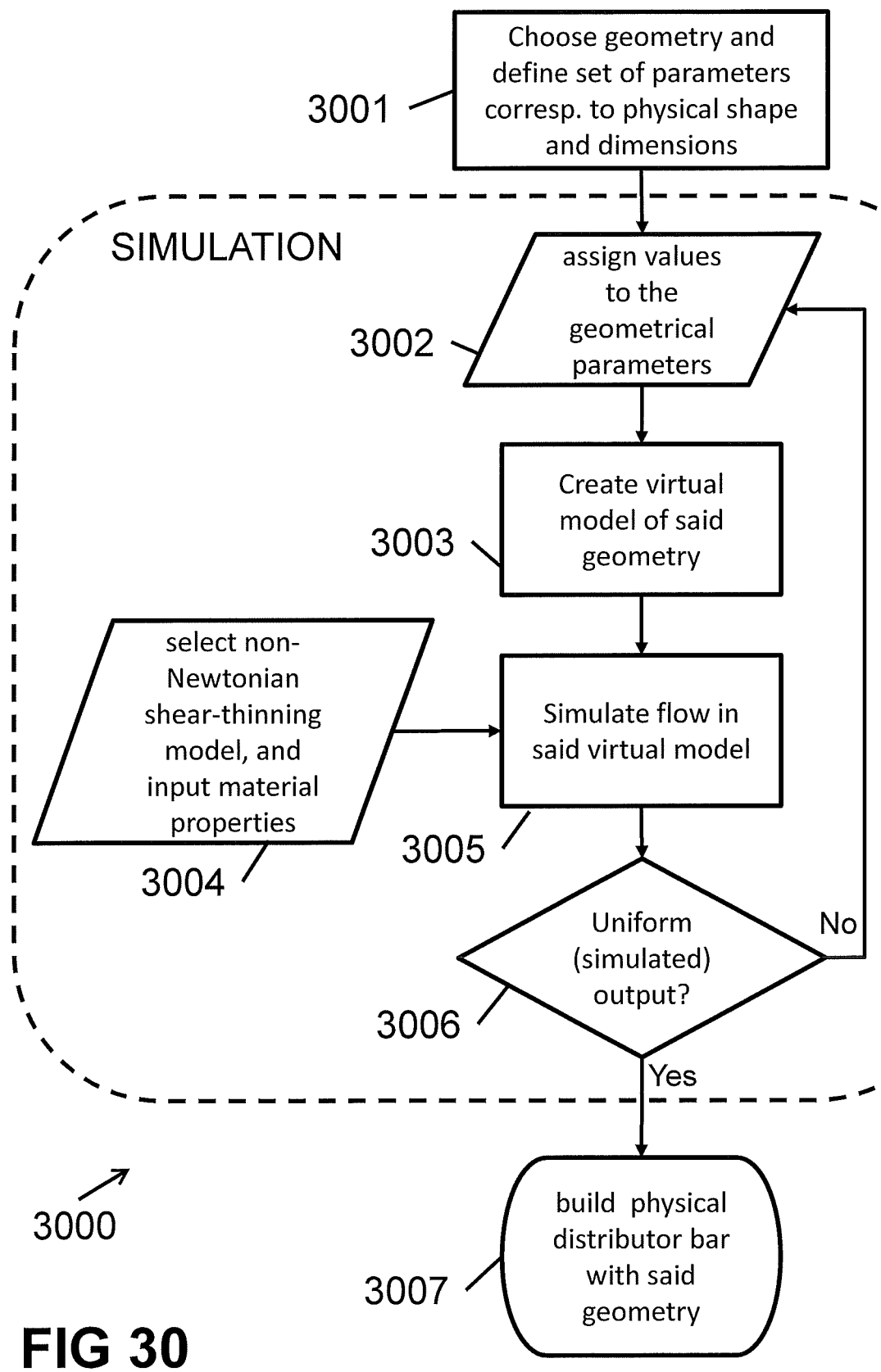
FIG. 30 is a flow-chart of a method of designing and manufacturing a distributor bar, according to the present invention.

FIG. 30 is a high-level flow-chart showing (at least part of) the method of designing and manufacturing a distributor bar, according to embodiments of the present invention.

In step 3001 a geometry is chosen, and a set of parameters corresponding to a physical shape and dimensions is defined.

In step 3002 (a first or a subsequent set of) values are assigned to the geometrical parameters.

In step 3003 a virtual model is build of said geometry. This step can mean for example setting boundary conditions in a simulation tool.

Figure 31:
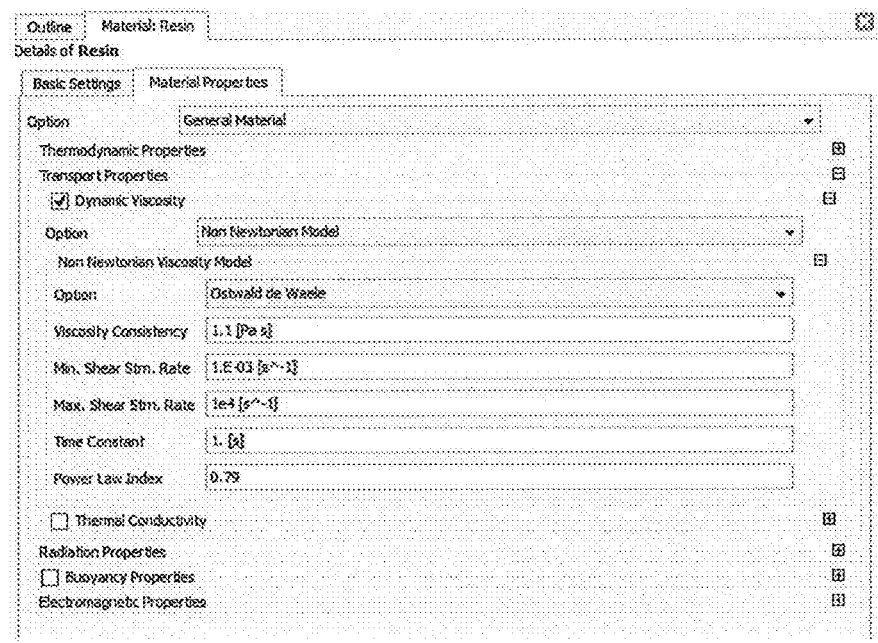
FIG. 31 is a screenshot of a simulation tool as can be used in embodiments of the present invention, showing how a particular non-Newtonian shear-thinning model, and particular parameters thereof can be taken into account in the simulation.

In step 3005 a computational fluid dynamics (CFD) computer simulation is performed to simulate the flow through said virtual model and to calculate the exit velocity profiles at each exit opening. This simulation is performed taking into account a non-Newtonian shear-thinning model using specific values for the viscous foamable liquid mixture for which the distributor bar is designed. This "taking into account" can be performed by selecting an appropriate non-Newtonian shear-thinning model, and by inputting material properties (step 3004). Selecting the shear-thinning model and setting particular values may be done via a menu-selection in the simulation tool (see screenshot of FIG. 31). In the example shown in FIG. 31, "Viscosity Consistency" corresponds to the value 'm' of the Power Law and is set to 1.1 [Pa s], and the value "Power Law Index" corresponds to the value 'n', and is set to 0.79 (see also FIGS. 13 and 14)

In step 3006 it is evaluated whether the resulting exit velocity profiles satisfy a predetermined condition, e.g. that the individual output flow rate of each exit pipe is constant within a predefined tolerance margin (for example +/−5%), or that the average output velocity of each exit pipe is constant within a predefined tolerance margin (for example +/−5%), and for example that those average velocities ly in the range of 2.5 to 3.5 m/s. If the condition is not satisfied for the chosen geometry, one or more parameters or variables may be adapted and the steps 3002, 3003, 3005, 3006 can be repeated, until a solution is found which satisfies the predefined criterium.

In step 3007, a physical distributor bar is built, for example using a prototyping or manufacturing process.

Of course, many variations are possible, for example, instead of stopping as soon as a solution is found that satisfies the criterium tested in step 3006, a predefined number of iterations may be performed, and the "best" result (e.g. the one with the most uniform flow) can be retained.

Details of the Viscosity Measurements

This section describes in more detail how the viscosity measurements leading to the results of FIG. 13 were performed, as an illustration of how the viscosity behavior of any foamable mixture can be measured, but of course, the invention is not limited to the specific details mentioned herein.

Formulation Description and Preparation

A composition of polyol (polyester) blend in parts by weight (pbw) is: Hoopol 1394: 100 pbw; L6900: 2 pbw; TCPP: 9 pbw; Cyclo/Iso pentane (70/30): 20.2 pbw; Water: 0.8 pbw. The isocyanate used was Suprasec S 2085. The mixing ratio was 17.4 g S 2085/12.7 g polyol blend. The formulation used in the measurements was catalyst free in order to allow sufficient time to study the early viscosity of the mixture which is important for the design. All contents were mixed for 5 s at 2000 RPM with a Heydolf mixer and applied immediately afterwards to rheometer.

Description of Measurements

The measurements were performed on a TA instruments AR 2000 rheometer with parallel disc plate geometry with a gap between the plates of 500 micrometres. Although the catalyst is removed the contents will nevertheless react slowly. To obtain the shear-rate dependence of the initial mixture a series of measurements must be performed at different operating conditions.

The measurements can be performed with three different operating modes, namely, 1) applying a constant shear stress to the material sample and observing the shear rate of the material over time;

2) applying a constant shear rate to the material sample and observing the shear stress of the material over time;

3) applying a ramp of shear stress to the material sample and observing the shear rate of the material over time.

To obtain the shear rate dependence of the initial mixture viscosity the following procedure could be followed, but other procedures known to persons skilled in the art, may also be used:

1) start recording time from the moment the contents of the formulation are mixed;

2) mix contents for a given amount of time (kept the same over different measurements) and apply immediately to the rheometer;

3) perform a series of experiments for the same formulation at either different constant shear stresses, different constant shear rates, different ramps of shear stress or combinations thereof;

4) observe the minimum time you obtain stable measurements for all experiments and record the shear stress vs. shear rate for the different experiments at this time;

5) the viscosity model should then be fitted to these data, as e.g. shown in FIG. 13, where the "power law" was chosen, but as already mentioned, also other viscosity models could have been used, in particular for example: Cross, Carreau Yasuda or Herschel Bulkley.

In Summary

As far as is known to the inventors, no distributor bars having the same geometry and (especially) the same dimensions as proposed by the present invention exist in the prior art, hence, they cannot provide the same behavior (when subjected to the same conditions).

Experience has shown that the classical design methods, which worked well for many years, didn't correspond well with reality anymore, for an unknown reason. It took several months of investigation, and many prototypes before the inventors came to the idea of trying to use a non-Newtonian shear thinning model (instead of a constant viscosity value) during the simulation, contrary to their feeling that such a model would have any significant impact, because the viscous foamable liquid mixture is only in the distributor bar for about 150 ms immediately after mixing, at which point in time, it is not yet foaming.

Furthermore, coming to the idea of "using a non-Newtonian shear thinning model" is one thing, but being able to actually do so required realistic values of the actual mixtures being used, and performing such a measurement with a mixture such as PUR or PIR (having a volume expansion factor of about 100, while not being able to add retarding agents because that would influence the measurement) was another big hurdle.

The next problem was related to the reactivity of the mixture, which typically increased along with the line speed. The inventors came up with a very elegant solution by incorporating the reactivity in the parameter "Nholes".

The next problem was related to finding suitable values for the large number of outlets (for example L[i], i=1 to 16), which was a problem of mathematical complexity, namely, how to limit the number of simulations to a reasonable number while still being able to find a good set of values. It is mentioned in this respect that mere "trial-and-error" or a "brute-force" approach (where all possible combinations are tested) was not a realistic option, simply because it would require a huge amount of time. In order to overcome this hurdle, the inventors came to the idea of using a mathematical expression in only two variables (a, k). This effectively enabled them to reduce the complexity from a (for example) 16-dimensional problem to a 2-dimensional problem. It is furthermore noted that one of these two "variables" (in the example described herein: the value 'k') is closely related to a parameter of the "non-Newtonian shear thinning model" (in the example described: k≈'n'+1), which is a considered a variable parameter for the mathematical simulation, but which is actually a constant of a particular mixture. Hence, also this approach was not trivial.

Finally, the mathematical model of the distributor bar was realized as a physical object, and only then it could be tested to verify if, and to what degree the behavior of the physical device corresponded with the simulations. It was found that the measurements showed a good correspondence with the simulations, despite all uncertainties. Looking back at all the hurdles that needed to be overcome to come to the solution proposed by the present invention, and the uncertainties and unpredictable outcome along the way, it is firmly believed that this solution is far from trivial.

REFERENCES 40, 80, 120, 210, 230, 240, 250, 260, 280, 290, 300: distributor bar 2 inlet
5 inner space
6 center line
p1-p12 outlets (e.g. exit pipes, exit slots)
4a, 4b, exit opening
t1-t12 track (or stream) of viscous foamable liquid material
w1-w12 width of track of viscous foamable liquid material
51, 91 laminator (also referred to as "first continuous belt system")
70 sandwich panel
71 expanded foam material
72 upper belt system
73 knit lines
101 uniform viscous foamable liquid layer
110 sandwich panel
111 expanded foam layer
72 upper belt system
L[ . . . ] array of lengths of the exit pipes (embodiments 1, 2, 3)
A[ . . . ] array of areas of the exit funnels (embodiment 4)

The invention claimed is:

1. A method of designing and manufacturing a distributor bar . . . the method comprising the steps of:
  a) choosing a geometry for the main channel (5) and defining a first set of parameters (Ddev, a, Lmin or Hmin) representative for a physical shape and physical dimensions of the main channel (5), choosing a geometry for the outlets (p1-p12) and defining a second set of parameters (L[i]; A[i]; H[i]) representative for a physical shape and physical dimensions of the outlets (p1-p12) for the distributor bar to be manufactured, and choosing a parameterized analytical function with only two parameters (k, a) for determining said number of second set of parameters (L[i]; A[i]; H[i]) wherein said parameterized analytical function in only two variables can be expressed by or is equivalent to function 1:

$L(z)=B+k(z/W)^a$ or can be expressed by or is equivalent to function 2:

$A(z)=B+k(z/W)^a$ or can be expressed by or is equivalent to function 3:

$H(z)=B+k(z/W)^a$ where B and W are constants, z for functions 1 and 2 is set to integer multiples of a distance d where d=W/(Nholes−1), z for function 3 is a continuous value for defining a curvature of the distributor bar, L is a length of one of the plurality of outlets, A is a cross sectional area of one of the plurality of outlets, and H is a height of one of the plurality of outlets;
  b) assigning values to the first set and second set parameters and calculating geometrical parameters for each of the outlets (p1-p12) using said analytical function;
  c) creating a virtual model using said geometrical parameters having said assigned values;
  d) simulating a flow of the viscous foamable liquid mixture in said virtual model by performing a Computational Fluid Dynamics simulation (CFD) on the parameterized analytical function, taking into account in the simulation a non-Newtonian shear thinning model and a predefined shear thinning parameter (n, m) of said viscous foamable liquid mixture;

e) calculating for the simulated flow the average exit velocity for each of the outlets (p1-p12), and calculating a variation of these average exit velocities, and evaluating whether the calculated variation of average exit velocities lies within the tolerance margin of at most +/−5%, and if an outcome of said evaluation is negative, repeating steps b) to e); and if an outcome of said evaluation is positive, either repeating steps b) to e) or going to step f);

f) building a physical distributor bar for distributing said viscous foamable liquid mixture, the physical distributor bar having a geometry that satisfies a criterion that the calculated variation of average exit velocities lies within the tolerance margin of at most +/−5%.

2. The method according to claim 1, wherein the non-Newtonian shear thinning model is selected from the group consisting of the following models: Ostwald de Waele, Cross, Carreau Yasuda, Herschel Bulkley, Bingham, Bird-Carreau and Casson.

3. The method according to claim 1, wherein step f) further comprises checking whether each of the average exit velocities lies in the range of 2.5 m/s to 3.5 m/s.

4. The method according to claim 1, wherein the tolerance margin is at most +/−4%.

5. The method according to claim 1, wherein the viscous foamable liquid mixture comprises raw materials for forming polyurethane (PUR) or polyisocyanurate (PIR) foam.

6. The method according to claim 1, wherein the viscous foamable liquid mixture comprises raw materials for forming polyurethane (PUR) or polyisocyanurate (PIR) foam, and wherein the non-Newtonian shear thinning model is represented by the formula: $\mu = m\dot{\gamma}^{n-1}$ with 'm' being a value in the range of 0.80 to 1.40 and 'n' being a value in the range of 0.50 to 0.90.

7. The method according to claim 1, wherein the viscous foamable liquid mixture comprises raw materials for forming polyurethane (PUR) with added air or polyisocyanurate (PIR) with added air foam, and wherein the non-Newtonian shear thinning model is represented by the formula: $\mu = m\dot{\gamma}^{n-1}$, with $m = m_0/(1-1.16\,\phi^{0.424})$ and $n = n_0 - 0.59\,\phi$, '$m_0$' being a value in the range of 0.80 to 1.40 and '$n_0$' being a value in the range of 0.50 to 0.90, and $\phi$ being the volume fraction of air added.

8. The method according to claim 1, wherein step b) comprises assigning such values that an estimate of an average residence time of the viscous foamable fluid mixture in the main channel is less than 150 ms, and wherein step e) further comprises calculating a calculated average residence time of the viscous foamable fluid mixture in the main channel and verifying whether the calculated average residence time is less than 150 ms.

9. The method according to claim 1, wherein step a) comprises choosing the geometry for the main channel (5) as being tubular and tapering towards the outer ends.

10. The method according to claim 1, wherein the geometry for the main channel (5) is chosen to have a cross sectional shape selected from the group consisting of: circular, elliptical, triangular, triangular with rounded edges, square, square with rounded edges, rectangular, rectangular with rounded edges, pentagonal, pentagonal with rounded edges, hexagonal, hexagonal with rounded edges, octagonal, octagonal with rounded edges, polygonal, polygonal with rounded edges, and wherein the cross sectional area of the main channel (5) varies continuously with distance from a center of the distributor bar.

11. The method according to claim 1, wherein the geometry of the main channel (5) is chosen to have a circular cross section with a first inner diameter (Ddev) in a middle of the distributor bar, and a second inner diameter ($\alpha$Ddev) at its outer ends, and wherein the diameter decreases in a continuous manner between a center of the distributor bar and the outer ends, and wherein a ratio ($\alpha$) of the second diameter and the first diameter is a value in the range of 50% to 95%.

12. The method according to claim 1, wherein: the geometry of the main channel (5) is chosen to have a straight center line (6); and the geometry of the outlets (p1-p12) is chosen to be cylindrical pipes with a constant inner diameter (Dhole), the pipes having a variable length (L[i]).

13. The method according to claim 1, wherein: the geometry of the main channel (5) is chosen to have a curved center line (6); the geometry of the outlets (p1-p12) is chosen to be cylindrical pipes with a constant inner diameter (Dhole), exit openings of each of the pipes (p1-p12) being located in a single plane.

14. The method according to claim 1, wherein: the geometry of the main channel (5) is chosen to have a straight center line (6); and the geometry of the outlets (p1-p12) is chosen to be exit slots having a constant cross section (Bslot, Wslot) over their length, the cross section being rectangular or rectangular with rounded edges, and having a variable length (L[i]).

15. The method according to claim 1, wherein: the geometry of the main channel (5) is chosen to have a straight center line (6); and the geometry of the outlets (p1-p12) is chosen to be funnels each comprising an exit opening (Dhole) wherein a diameter of each of the exit openings is the same, the funnels having different cross-sectional areas (A[i]) at their interface with the main channel (5).

16. The method according to claim 1, wherein the building of step f) comprises injection moulding using materials comprising polyamide 6 (PA6) or acrylonitrile butadiene styrene (ABS).

17. The method according to claim 1, wherein the building of step f) comprises stereolithography additive manufacturing using materials comprising Tusk XC2700.

18. The method according to claim 1, wherein the building of step f) comprises Fused deposition modeling additive manufacturing using materials comprising acrylonitrile butadiene styrene (ABS).

19. The method according to claim 1, wherein the building of step f) comprises Computer numerical control (CNC) milling using metal material or metal alloys.

20. The method according to claim 19, wherein the metal material or metal alloy is aluminum, steel, aluminum alloys, steel alloys, or stainless-steel.

* * * * *